US008616965B2

(12) United States Patent
Inamura et al.

(10) Patent No.: US 8,616,965 B2
(45) Date of Patent: Dec. 31, 2013

(54) GAMING MACHINE ACCEPTING SIDE BET AND PLAYING METHOD THEREOF

(75) Inventors: Yukinori Inamura, Koto-ku (JP); Kenta Kitamura, Koto-ku (JP); Hiroki Munakata, Koto-ku (JP)

(73) Assignees: Universal Entertainment Corp., Tokyo (JP); Aruze Gaming America, Inc., Las Vegas, NV (US)

( * ) Notice: Subject to any disclaimer, the term of this patent is extended or adjusted under 35 U.S.C. 154(b) by 258 days.

(21) Appl. No.: 12/782,095

(22) Filed: May 18, 2010

(65) Prior Publication Data

US 2010/0304851 A1 Dec. 2, 2010

(30) Foreign Application Priority Data

May 28, 2009 (JP) ................................ 2009-129324

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................. 463/26; 463/11; 463/12; 463/13; 273/274; 273/292; 273/303

(58) Field of Classification Search

USPC ................ 273/274, 292, 303; 463/11–13, 26

See application file for complete search history.

(56) References Cited

U.S. PATENT DOCUMENTS

| | | | | |
|---|---|---|---|---|
| 5,673,917 | A * | 10/1997 | Vancura | 273/292 |
| 5,839,730 | A * | 11/1998 | Pike | 273/292 |
| 6,523,829 | B1 * | 2/2003 | Walker et al. | 273/292 |
| 2005/0023758 | A1 * | 2/2005 | Noyes | 273/292 |
| 2006/0131809 | A1 * | 6/2006 | Lancaster et al. | 273/292 |
| 2008/0227513 | A1 | 9/2008 | Yoshizawa | |
| 2009/0111573 | A1 * | 4/2009 | Iddings | 463/25 |
| 2009/0247291 | A1 | 10/2009 | Inamura et al. | |
| 2009/0312084 | A1 | 12/2009 | Inamura et al. | |

FOREIGN PATENT DOCUMENTS

| | | |
|---|---|---|
| AU | 711529 | 10/1999 |
| AU | 764953 | 9/2003 |

OTHER PUBLICATIONS

U.S. Appl. No. 12/209,132, filed Sep. 11, 2008, Inamura, et al.
U.S. Appl. No. 12/235,299, filed Sep. 22, 2008, Inamura.
U.S. Appl. No. 12/779,342, filed May 13, 2010, Okada.
U.S. Appl. No. 12/782,191, filed May 18, 2010, Munakata.
U.S. Appl. No. 12/782,260, filed May 18, 2010, Kitamura, et al.

* cited by examiner

*Primary Examiner* — Omkar Deodhar
*Assistant Examiner* — Adetokunbo O Torimiro
(74) *Attorney, Agent, or Firm* — KMF Patent Services, PLLC; S. Peter Konzel; Kenneth M. Fagin

(57) ABSTRACT

A gaming machine executing the processing of (A) accepting an input for placing a normal bet; (B) accepting an input for placing a side bet different from the normal bet, (C) starting a card game and displaying a player initial card on a display; (D) determining a result of a side game based on the player initial card, when a side bet has been placed; and (E) offering a first payout based on the result of the side game, advancing the card game to determine a result of the card game, and offering a second payout based on the result of the card game.

14 Claims, 22 Drawing Sheets

GAMING MACHINE ACCEPTING SIDE BET AND PLAYING METHOD THEREOF

CROSS-REFERENCE TO RELATED APPLICATIONS

This application is based upon and claims a priority from the prior Japanese Patent Application No. 2009-129324 filed on May 28, 2009, the entire contents of which are incorporated herein by reference.

BACKGROUND OF THE INVENTION

1. Field of the Invention

The present invention relates to a gaming machine accepting a side bet and a playing method thereof.

2. Discussion of the Background

Conventionally, gaming machines capable of accepting a side bet different from a normal bet have been provided.

For example, Patent Documents 1 to 3 disclose gaming machines in which a sub game (side game) is played aside from a basic game (normal Blackjack game) on condition that a side bet has been placed. In such gaming machines, a result of the side game is determined by using cards distributed to the player in a Blackjack game.

Generally, when a game starts in card games such as blackjack, a predetermined number (for example, two cards in a blackjack game) of cards (hereinafter, also referred to as player initial cards) are first distributed to each player. Then, a player may request for distribution of another card (hereinafter, also referred to as a player additional card) to add to the player initial cards or to exchange with one of the player initial cards. In a card game, each combination of cards is usually allocated with a different strength, and a player can receive a payout when his or her combination of cards is comparatively strong.

Patent Document 1: AU 711529

Patent Document 2: AU 764953

Patent Document 3: US 2008/0227513-A1

SUMMARY OF THE INVENTION

Player initial cards generally make a difference in whether or not a player can get a payout in a game. Namely, good player initial cards may increase a probability of the player's winning in the game. In this context, the player initial cards make a difference in the result of the game and are significantly important cards for the player.

Against this background, the present inventors have arrived at the following idea. Associating player initial cards with a side-bet function of a gaming machine accepting a side bet may increase the player's interest in player initial cards, leading to a more interesting game.

The present invention was made in view of the above mentioned ideas, and an object thereof is to provide a gaming machine capable of offering a more interesting game by increasing the player's interest in player initial cards; and a playing method thereof.

The present invention provides a gaming machine having the following configuration.

(1) That is, a gaming machine comprises: a display capable of displaying a plurality of playing cards; a memory storing a card game program for controlling progress of a card game played with the plurality of playing cards: an input device with which a player can input a command in a game; and a controller. The controller is programmed to execute the processing of: (A) accepting an input for placing a normal bet from the input device; (B) accepting an input for placing a side bet different from the normal bet from the input device, (C) starting the card game based on the card game program stored in the memory and displaying a player initial card on the display; (D) determining a result of a side game based on the player initial card displayed on the display in the processing (C), when a side bet has been placed in the processing (B); and (E) offering a first payout based on the result of the side game determined in the processing (D), advancing the card game based on the card game program stored in the memory to determine a result of the card game, and offering a second payout based on the result of the card game.

Player initial cards generally make a difference in the result of a card game (e.g. a normal game of Blackjack) and are significantly important cards for the player. Accordingly, after placing a bet, the player generally waits for distribution of player initial cards with a feeling of hope for good player initial cards. Further, when the player receives the player initial cards that allow the player to be sure about his or her winning in the game (e.g. "A" and "J" as player initial cards in a Blackjack game), the player may be pleased.

According to the invention of (1), the first payout is offered based on the result of the side game when a side bet has been placed. The result of the side game is determined based on the player initial cards. Namely, the player initial cards make a difference not only in the result of the card game, but also in the result of the side game (i.e. whether or not the player can get the first payout).

Therefore, it is possible to increase the player's feeling of hope for good player initial cards and to please the player when the good player initial cards have been distributed to the player. As a result, a more interesting game can be offered.

In the invention of (1), timing of offering the first payout and timing of offering the second payout may be same or different. For example, both the first payout and the second payout may be offered after the result of the card game is determined. Alternatively, the first payout may be offered after the result of the side game is determined and before the result of the card game is determined.

Further, the present invention provides a gaming machine having the following configuration.

(2) That is, a gaming machine comprises: a display capable of displaying a plurality of playing cards; an input device with which a player can input a command in a game; and a controller. The controller is programmed to execute the processing of: (A) accepting an input for placing a normal bet from the input device; (B) accepting an input for placing a side bet different from the normal bet from the input device, (C) displaying a player initial card on the display; (D) determining a result of a side game based on the player initial card displayed on the display in the processing (C), when a side bet has been placed in the processing (B); (E) accepting a card addition command for displaying a player additional card different from the player initial card or a card determination command for not displaying the player additional card from the input device after the player initial card have been displayed in the processing (C); (F) displaying the player additional card on the display when the card addition command has been inputted in the processing (E); (G) determining a result of a normal game based on player cards specified by the player initial card displayed in the processing (C) and the player additional card displayed in the processing (F), when the card determination command has been inputted in the processing (E); and (H) offering a normal payout based on the result of the normal game determined in the processing (G) and an additional payout based on the result of the side game determined in the processing (D).

Player initial cards generally make a difference in the result of a card game (normal game, e.g. a normal game of Blackjack) and are significantly important cards for the player. Accordingly, after placing a bet, the player generally waits for distribution of player initial cards with a feeling of hope for good player initial cards. Further, when the player receives the player initial cards that allow the player to be sure about his or her winning in the game (e.g. "A" and "J" as player initial cards in a Blackjack game), the player may be pleased.

According to the invention of (2), an additional payout is offered based on the result of the side game when a side bet has been placed. The result of the side game is determined based on the player initial cards. Namely, the player initial cards make a difference not only in the result of the normal game, but also in the result of the side game (i.e. whether or not the player can get the additional payout).

Therefore, it is possible to increase the player's feeling of hope for good player initial cards and to please the player when the good player initial cards have been distributed to the player. As a result, a more interesting game can be offered.

According to the invention of (2), a card addition command or a card determination command is accepted after the player initial cards have been distributed. The card addition command is for requesting distribution of a player additional card. When the card addition command is inputted, a player additional card is distributed. On the other hand, the card determination command is for not requesting distribution of a player additional card. When the card determination command is inputted, the result of the normal game is determined based on player cards.

The player cards include the player initial cards and the player additional card. Namely, the player cards are: the player initial cards and the player additional card added thereto; or the player initial cards, a part or all of which are replaced by the player additional cards. Namely, the player makes the player cards by adding the player additional card to the cards already distributed or by exchanging the card already distributed with the player additional card. The result of the normal game is determined based on the thus-made player cards.

In this context, the card addition command and the card determination command make a difference in the result of the normal game, namely, player's gaming skill affects the result of the normal game. On the other hand, the result of the side game is determined irrespective of the card addition command and the card determination command. Therefore, the result of the side game is not affected by the player's gaming skill and is a matter of absolute chance. According to the invention of (2), the player can enjoy these two types of games.

In the invention of (2), the timing of "(H) offering a normal payout based on the result of the normal game determined in the processing (G) and an additional payout based on the result of the side game determined in the processing (D)" is not particularly limited. The timing of offering the normal payout and the timing of offering the additional payout may be same or different. For example, both the normal payout and the additional payout may be offered after the result of the normal game is determined. Alternatively, the additional payout may be offered after the result of the side game is determined and before the card addition command or the card determination command is inputted.

Further, the present invention provides a gaming machine having the following configuration.

(3) That is, a gaming machine comprises: a display capable of displaying a plurality of playing cards; a memory for storing a card game program for controlling progress of a card game played with the plurality of playing cards; an input device with which a player can input a command in a game; and a controller. The controller is programmed to execute the processing of: (A) accepting an input for placing a normal bet from the input device; (B) accepting an input for placing a side bet different from the normal bet from the input device, (C) cumulatively storing a predetermined percentage of side betted game media when a side bet has been placed in the processing (B); (D) starting the card game based on the card game program stored in the memory and displaying a player initial card on the display; (E) determining a result of a side game based on the player initial card displayed on the display in the processing (D), when a side bet has been placed in the processing (B); and (F) offering a first payout based on the result of the side game determined in the processing (E) and the game media stored in the processing (C), advancing the card game based on the card game program stored in the memory to determine a result of the card game, and offering a second payout based on the result of the card game.

Player initial cards generally make a difference in the result of a card game (e.g. a normal game of Blackjack) and are significantly important cards for the player. Accordingly, after placing a bet, the player generally waits for distribution of player initial cards with a feeling of hope for good player initial cards. Further, when the player receives the player initial cards that allow the player to be sure about his or her winning in the game (e.g. "A" and "J" as player initial cards in a Blackjack game), the player may be pleased.

According to the invention of (3), the first payout is offered based on the result of the side game when a side bet has been placed. The result of the side game is determined based on the player initial cards. Namely, the player initial cards make a difference not only in the result of the card game, but also in the result of the side game (i.e. whether or not the player can get the first payout).

Therefore, it is possible to increase the player's feeling of hope for good player initial cards and to please the player when the good player initial cards have been distributed to the player. As a result, a more interesting game can be offered.

In the invention of (3), timing of offering the first payout and timing of offering the second payout may be same or different. For example, both the first payout and the second payout may be offered after the result of the card game is determined. Alternatively, the first payout may be offered after the result of the side game is determined and before the result of the card game is determined.

According to the invention of (3), a predetermined percentage of side-betted game media is cumulatively stored when a side bet has been placed. The first payout is offered based on the stored game media. Namely, the side-betted game media is the source of the first payout.

Accordingly, the player may be interested in how much side-betted game media has been stored. Further, the player winning the side game may feel that he or she has received the profit from the game media that is an accumulation of other players' side bets, so that the player enjoys a feeling of superiority. This may be an attractive point of the side game and encourages the player to place a side bet. Consequently, the side game becomes more exciting.

Furthermore, the present invention provides a gaming machine having the following configuration.

(4) That is, a gaming machine comprises: a display capable of displaying a playing card allocated with a number and a suit; a memory storing a card game program for controlling progress of a card game played with the playing card; an input device with which a player can input a command in a game: and a controller. The controller is programmed to execute the processing of: (A) accepting an input for placing a normal bet from the input device; (B) accepting an input for placing a side bet different from the normal bet from the input device, (C) starting the card game based on the card game program stored in the memory and displaying a plurality of player initial cards on the display; (D) determining whether or not a combination of numbers and suits allocated to the player initial cards displayed on the display in the processing (C) is a predetermined combination to determine a result of a side game, when a side bet has been placed in the processing (B); and (E) offering a first payout based on the result of the side game determined in the processing (D), advancing the card game based on the card game program stored in the memory to determine a result of the card game, and offering a second payout based on the result of the card game.

The player initial cards normally make difference in the result of a card game (e.g. a normal game of Blackjack) and are significantly important cards for the player. Accordingly, after placing a bet, the player generally waits for distribution of player initial cards with a feeling of hope for good player initial cards. Further, when the player receives the player initial cards that allow the player to be sure about his or her winning in the game (e.g. “A” and “J” as player initial cards in a Blackjack game), the player may be pleased.

According to the invention of (4), the first payout is offered based on the result of the side game when a side bet has been placed. The result of the side game is determined based on the player initial cards. Namely, the player initial cards make a difference not only in the result of the card game, but also in the result of the side game (i.e. whether or not the player can get the first payout).

Therefore, it is possible to increase the player’s feeling of hope for good player initial cards and to please the player when the good player initial cards have been distributed to the player. As a result, a more interesting game can be offered.

In the invention of (4), timing of offering the first payout and timing of offering the second payout may be same or different. For example, both the first payout and the second payout may be offered after the result of the card game is determined. Alternatively, the first payout may be offered after the result of the side game is determined and before the result of the card game is determined.

According to the invention of (4), a number and a suit are allocated to the playing card. The result of the side game is determined by determining whether or not the combination of the numbers and the suits allocated to the player initial cards is a predetermined combination. Therefore, it is possible to have a player greatly interested in the combination of the numbers and the suits allocated to the player initial cards.

A predetermined hand (e.g. so-called “Blackjack” in a Blackjack game) in a card game is desirably formed by a combination (e.g. a combination of “A” and “J”) employed as the above predetermined combination. In such a case, when the player has the player initial cards allocated with the numbers and the suits which make up the predetermined combination, it is highly possible that the player gets both the first payout and the second payout. Accordingly, it is possible to make the player have a strong feeling of hope for receiving the player initial cards allocated with the numbers and the suits which make up a predetermined combination. In the case where the player receives the player initial cards allocated with the numbers and the suits which make up a predetermined combination, it is possible to offer a great satisfaction to the player. As a result, the player may be more absorbed in the game.

The present invention provides a playing method of a game having the following configuration.

(5) That is, a playing method of a game comprises the steps of: (A) accepting a normal bet; (B) accepting a side bet different from the normal bet; (C) starting a card game and distributing a player initial card to a player; (D) determining a result of a side game based on the player initial card distributed in the step (C), when a side bet has been placed in the step (B); and (E) offering a first payout based on the result of the side game determined in the step (D), advancing the card game to determine a result of the card game, and offering a second payout based on the result of the card game.

Player initial cards generally make a difference in the result of a card game (e.g. a normal game of Blackjack) and are significantly important cards for the player. Accordingly, after placing a bet, the player generally waits for distribution of player initial cards with a feeling of hope for good player initial cards. Further, when the player receives the player initial cards that allow the player to be sure about his or her winning in the game (e.g. “A” and “J” as player initial cards in a Blackjack game), the player may be pleased.

According to the invention of (5), the first payout is offered based on the result of the side game when a side bet has been placed. The result of the side game is determined based on the player initial cards. Namely, the player initial cards make a difference not only in the result of the card game, but also in the result of the side game (i.e. whether or not the player can get the first payout).

Therefore, it is possible to increase the player’s feeling of hope for good player initial cards and to please the player when the good player initial cards have been distributed to the player. As a result, a more interesting game can be offered.

In the invention of (5), timing of offering the first payout and timing of offering the second payout may be same or different. For example, both the first payout and the second payout may be offered after the result of the card game is determined. Alternatively, the first payout may be offered after the result of the side game is determined and before the result of the card game is determined.

The present invention provides a gaming machine capable of offering a more interesting game by increasing the player’s interest in the player initial cards, and a playing method thereof.

DESCRIPTION OF THE EMBODIMENTS

Figure 1A:
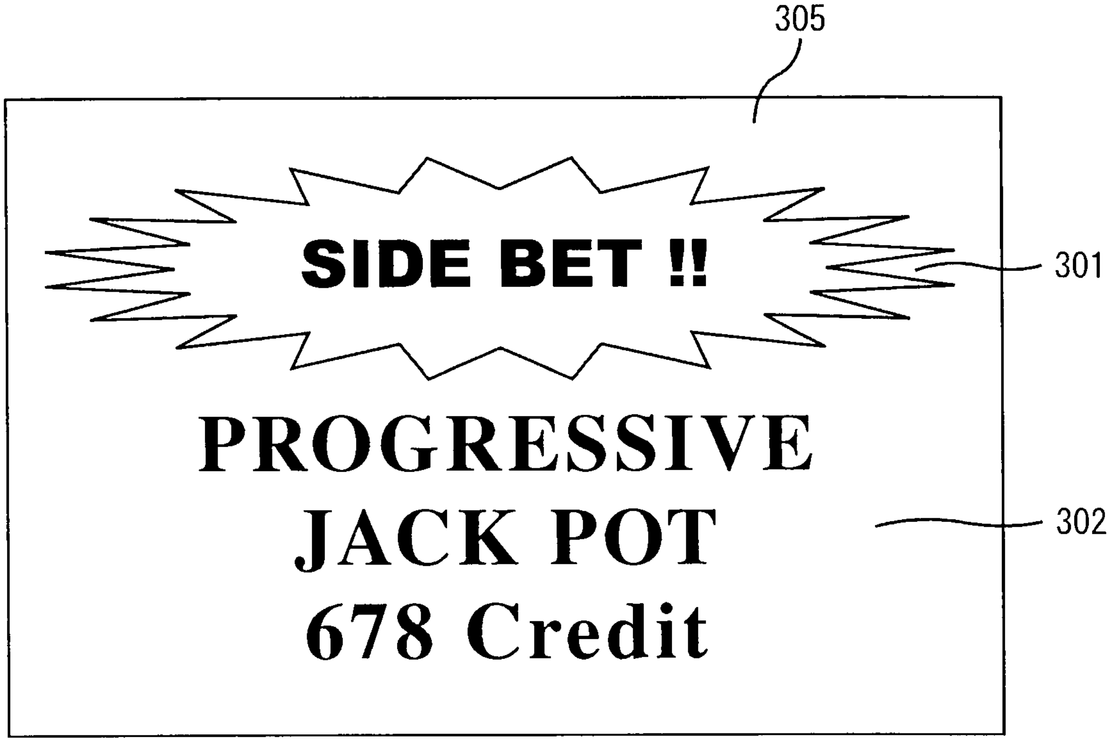
FIG. 1A is a view illustrating an exemplary image displayed on a liquid crystal display in a gaming machine according to a first embodiment.

Hereinafter, embodiments (first embodiment and second embodiment) of the present invention will be described.

A gaming machine 1 according to the embodiments of the present invention executes a Blackjack game.

First, a Blackjack game will be described. It is to be noted the Blackjack game described here corresponds to the card game and the normal game of the present invention.

In a Blackjack game, six decks or eight decks of playing cards (52 cards in one deck) are used. One or more players play a game against a dealer. Each card has one number and one suit drawn thereon. The number drawn on each card is one of "2", "3", "4", "5", "6", "7", "8", "9", "10", "J", "Q", "K", and "A". The suit drawn on each card is one of "Spades", "Hearts", "Diamonds", and "Clubs". Note that, in the present description, symbols "J", "Q", "K", and "A" are also called numbers.

The height is compared between the card total of the cards distributed to the player (player cards) and the card total of the cards distributed to the dealer (dealer cards) to determine the result of a game. It is to be noted that one who has the card total (total of the numbers drawn on cards) larger than 21 loses the game. Accordingly, the player plays a game to get a higher card total without going over 21. In the Blackjack game, the card total is calculated as follows. Namely, "A" values 1 or 11, a face card ("J", "Q", and "K") values 10, and other cards with a number 2 to 10 value as that value.

Specifically, a Blackjack game is played as follows.

First, two cards are respectively distributed to players having placed normal bets and to a dealer. The two cards distributed to each player are referred to as player initial cards in the present description.

After receiving the cards, each player selects one of options including "hit", "stand", "split", "double down", "insurance", and "surrender".

Selecting "hit" corresponds to a request for another card.

Selecting "stand" corresponds to requesting no more cards.

"Split" can be selected when the player receives two cards of the same value. The player splits these two cards and receives a new card to pair with each split card so as to play two separate hands.

Selecting "double down" corresponds to doubling the normal bet amount in exchange for requesting only one more card.

"Insurance" can be selected to take the normal bet credits back by further placing a bet of half the amount of the normal bet amount when a combination of the two cards distributed to the dealer forms a so-called "Blackjack" (the two cards are an "A" card and a card valuing 10).

Selecting "surrender" corresponds to taking the normal bet credits back by further placing a bet of half the amount of the normal bet and giving up the game.

The card addition command of the present invention includes "hit" and "double down". A card to be distributed in "hit" or "double down" is referred to as a player additional card in the present description.

"Stand" corresponds to the card determination command of the present invention.

After hands of all the players playing the game are fixed, the dealer hits the card until the dealer has the card total of 17 or more. Then, the card total of the dealer and the card total of the player are compared to determine the result of the game. In the case of player's winning, the player gets a profit corresponding to the amount of the normal bet. In the case of dealer's winning, on the other hand, the player loses the amount of the normal bet.

In a case where initially received cards are a "A" card and a card valuing 10 (Blackjack hand is established), the two-card total of 21 is higher as a hand than the three-or-more-card total of 21. In the case where the player establishes a Blackjack hand, the player can get a profit corresponding to 1.5 times of the normal bet.

There has been described a Blackjack game.

In a gaming machine 1 according to the embodiments of the present invention, a side game is played aside from a Blackjack game.

In the following, the side game according to first to third embodiments is described with reference to drawings.

[First Embodiment]

Figure 1B:
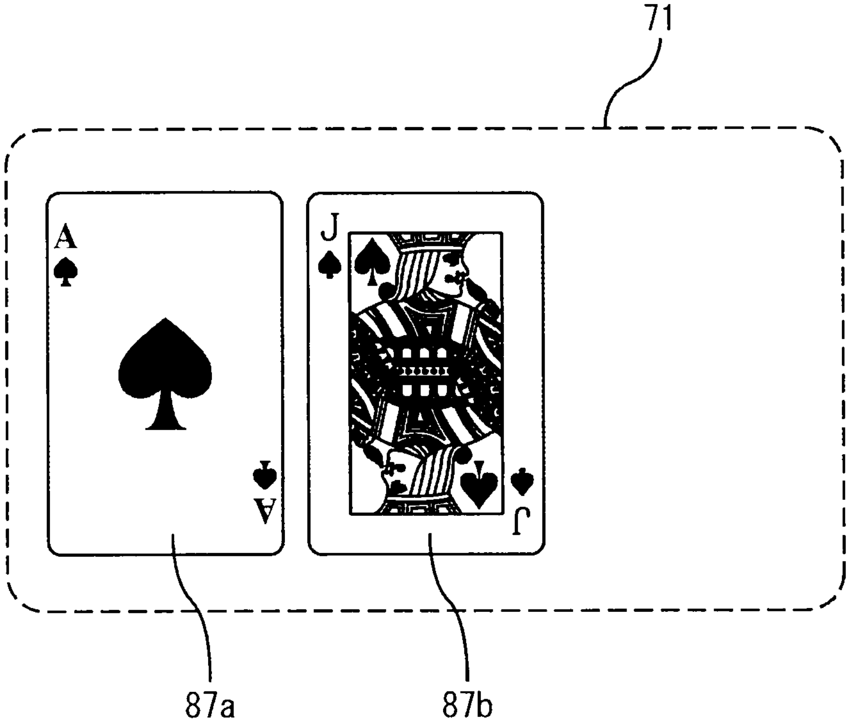
FIG. 1B is a view illustrating an exemplary image displayed on the liquid crystal display in the gaming machine according to the first embodiment.
Figure 1C:
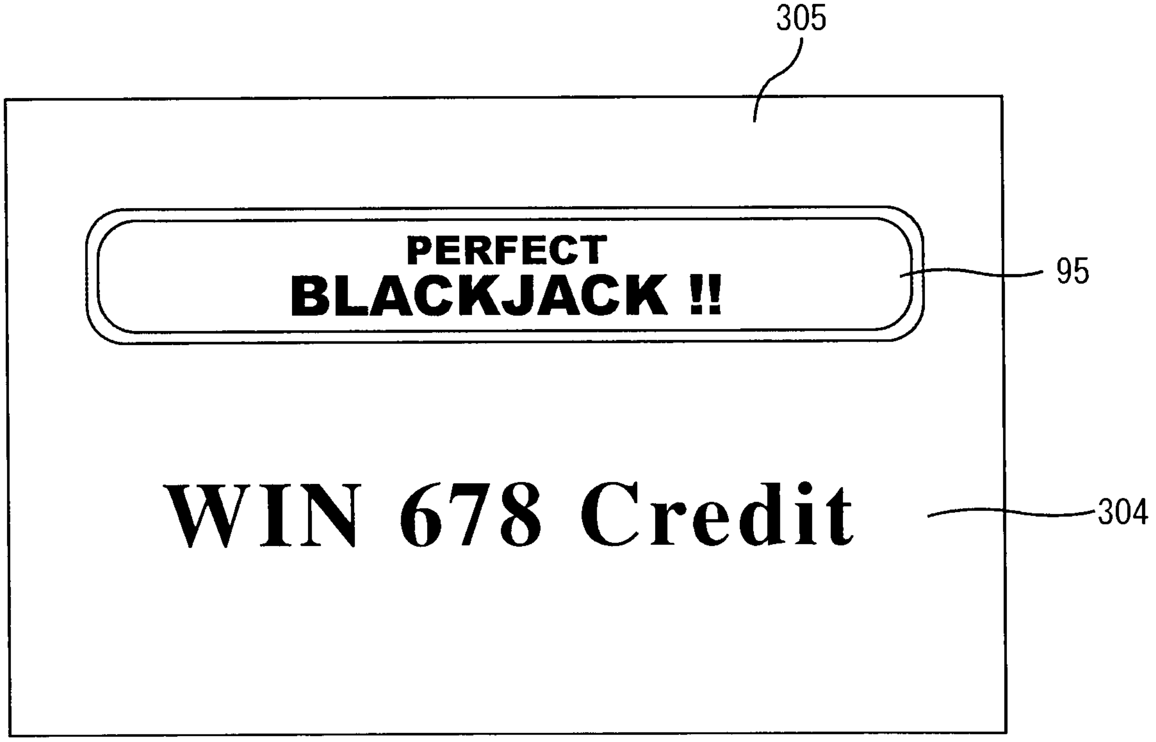
FIG. 1C is a view illustrating an exemplary image displayed on the liquid crystal display in the gaming machine according to the first embodiment.

First, an outline of the first embodiment is described with reference to FIGS. 1 (FIG. 1A to FIG. 1C).

FIGS. 1A to 1C are views each illustrating an exemplary image displayed on a liquid crystal display in a gaming machine according to the first embodiment.

FIG. 1A illustrates a side bet image 301 and a number-of-jackpot image 302 displayed in a side game-related information display area 305.

The side bet image 301 is an image indicating that a side bet has been placed in a current game.

The number-of-jackpot image 302 is an image indicating the number of jackpots at present. When a side bet is placed, side-betted credit is cumulatively stored in the present embodiment. The number of jackpots indicates the number of credits cumulatively stored in this manner.

Figure 6:
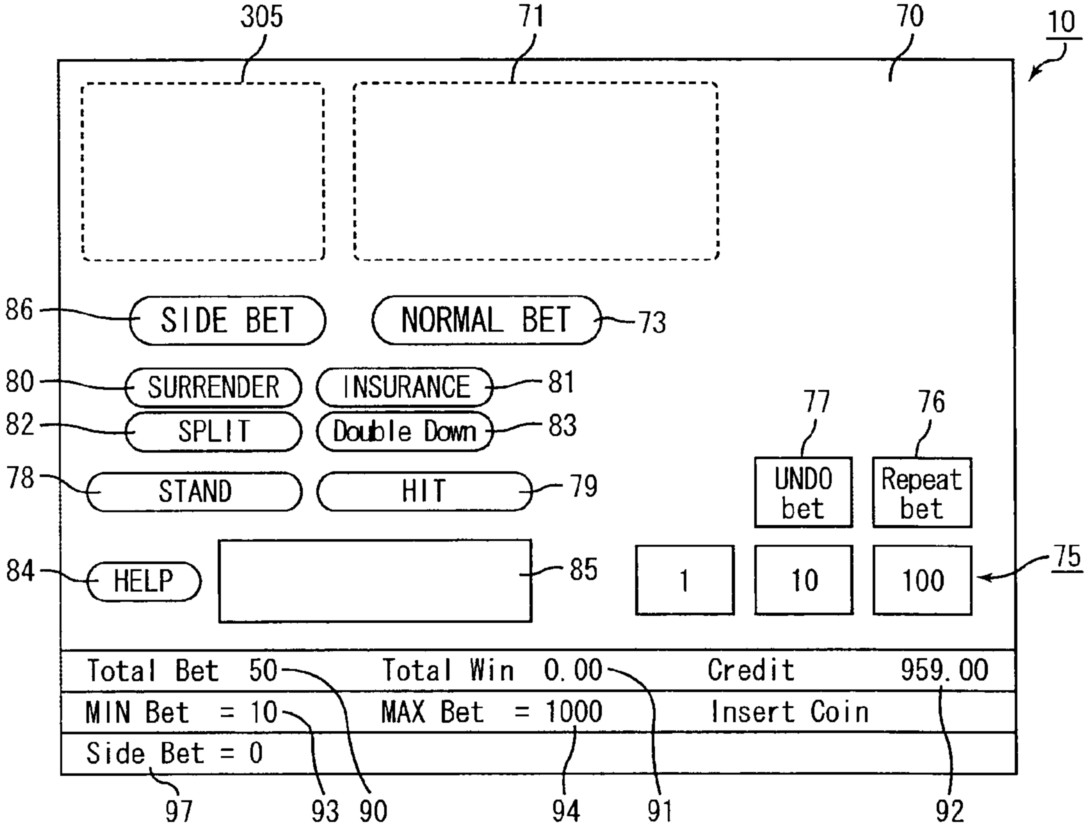
FIG. 6 is an explanatory view illustrating a game screen displayed on the liquid crystal display of one of the player terminals.

It is to be noted that the side game-related information display area 305 is an area provided in a liquid crystal display 10 (see FIG. 6).

FIG. 1B illustrates two player initial cards 87 (player initial cards 87*a* and 87*b*) displayed in a player card display area 71. The player card display area 71 is provided in the liquid crystal display 10 (see FIG. 6).

FIG. 1B indicates "A of Spades" as the player initial card 87*a* and "J of Spades" as the player initial card 87*b*.

In the present description, "'PERFECT BLACKJACK' is established" in a case where two player initial cards include "A of Spades" and "J of Spades" and in a case where two player initial cards include "A of Spades" and "J of Clubs".

FIG. 1C illustrates a side-game-result image 95 and a side payout image 304 displayed in the side game-related information display area 305.

The side-game-result image 95 is an image indicating a result of a side game.

The side payout image 304 is an image indicating the number of credits to be paid out based on the result of a side game.

When "'PERFECT BLACKJACK' is established" in a game in which a side bet has been placed in the first embodiment, the result of a side game is "PERFECT BLACKJACK".

FIG. 1C illustrates an image showing characters "PERFECT BLACKJACK" displayed as the side-game-result image 95 because "'PERFECT BLACKJACK' is established" as illustrated in FIG. 1B.

In the first embodiment, credit in an amount corresponding to the number of jackpots is paid out as a side payout when the result of the side game is "PERFECT BLACKJACK". The side payout image 304 illustrated in FIG. 1C indicates that a credit of 678 is paid out as the side payout because the number of jackpots is 678 as illustrated in FIG. 1A.

In the first embodiment, the side payout is offered only in the case where the result of the side game is "PERFECT BLACKJACK".

The side payout corresponds to the first payout and the additional payout of the present invention.

As above, there has been described the outline of the first embodiment with reference to FIGS. 1.

Hereinafter, the first embodiment will be further described in detail.

In the following, an outline of the gaming machine 1 according to the present embodiment will be described in detail with reference to the accompanying drawings. The gaming machine 1 according to the present embodiment is a kind of multiplayer participation gaming machine. Accordingly, the gaming machine 1 is provided with a plurality of player terminals 4 (see FIG. 2). In the gaming machine 1, Blackjack, one of card games, is executed.

First, a general structure of the gaming machine 1 according to the present embodiment will be described in detail with reference to accompanying drawings.

Figure 2:
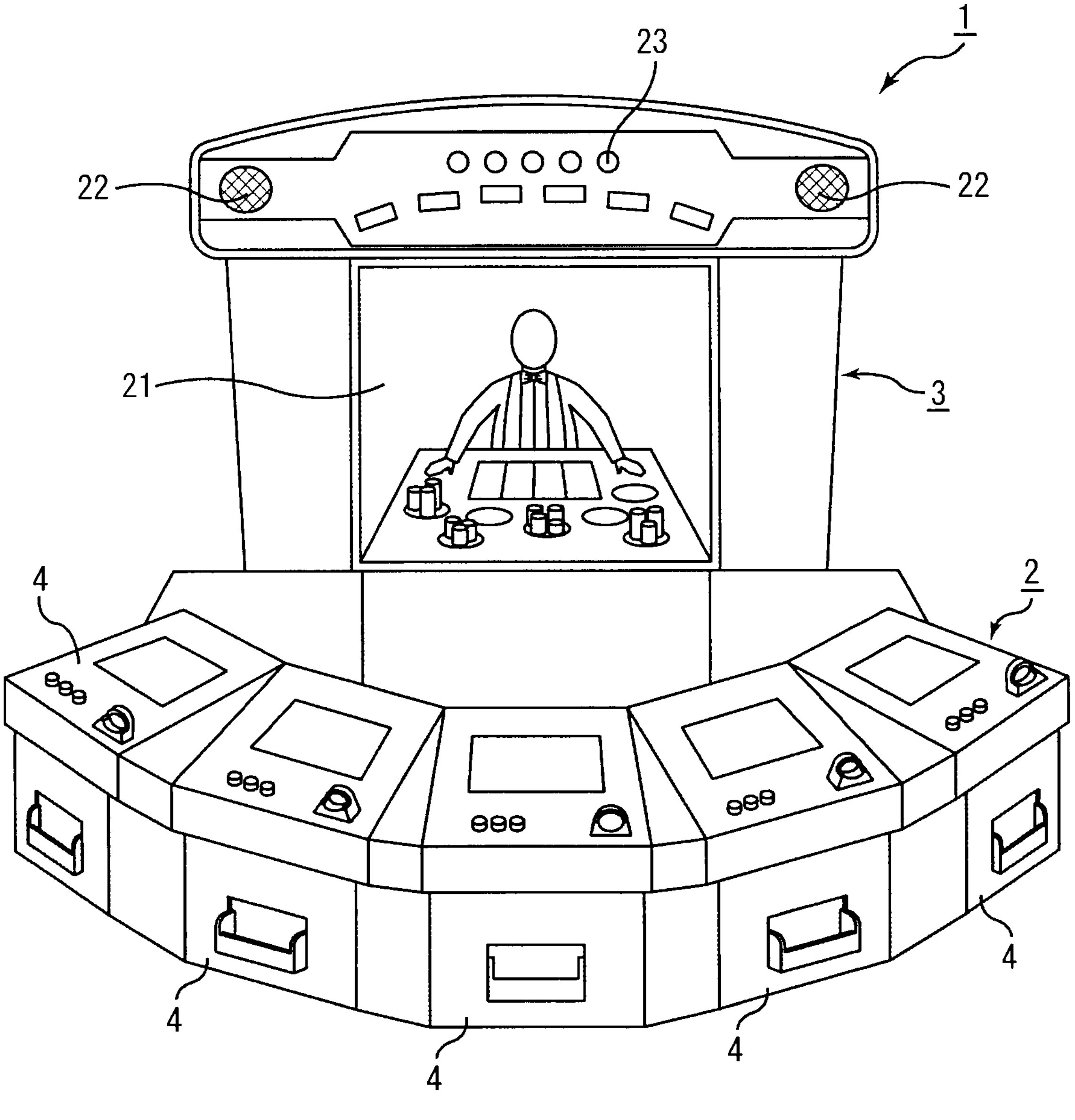
FIG. 2 is an outline view of a gaming machine according to one embodiment of the present invention.

FIG. 2 is an outline view of the gaming machine 1 according to one embodiment of the present invention.

The gaming machine 1 according to the present embodiment is basically provided with a table portion 2 and a panel portion 3. The table portion 2 is a portion enabling players to play a game by taking a seat, and has the plurality of player terminals 4 described above. The panel portion 3 is set up in a front direction of the players taking a seat at the table portion 2. This panel portion 3 is provided with a front display 21, as described later. The front display 21 displays an animation image of a dealer or the like in accordance with the progress of a game.

Next, the table portion 2 constituting the gaming machine 1 will be described in detail with reference to the accompanying drawings. As shown in FIG. 2, the table portion 2 has the plurality of (five in FIG. 2) player terminals 4 arranged in a general fan shape.

In this context, the structure of one player terminal 4 that constitutes the table portion 2 will be described in detail with reference to an accompanying drawing.

Figure 3:
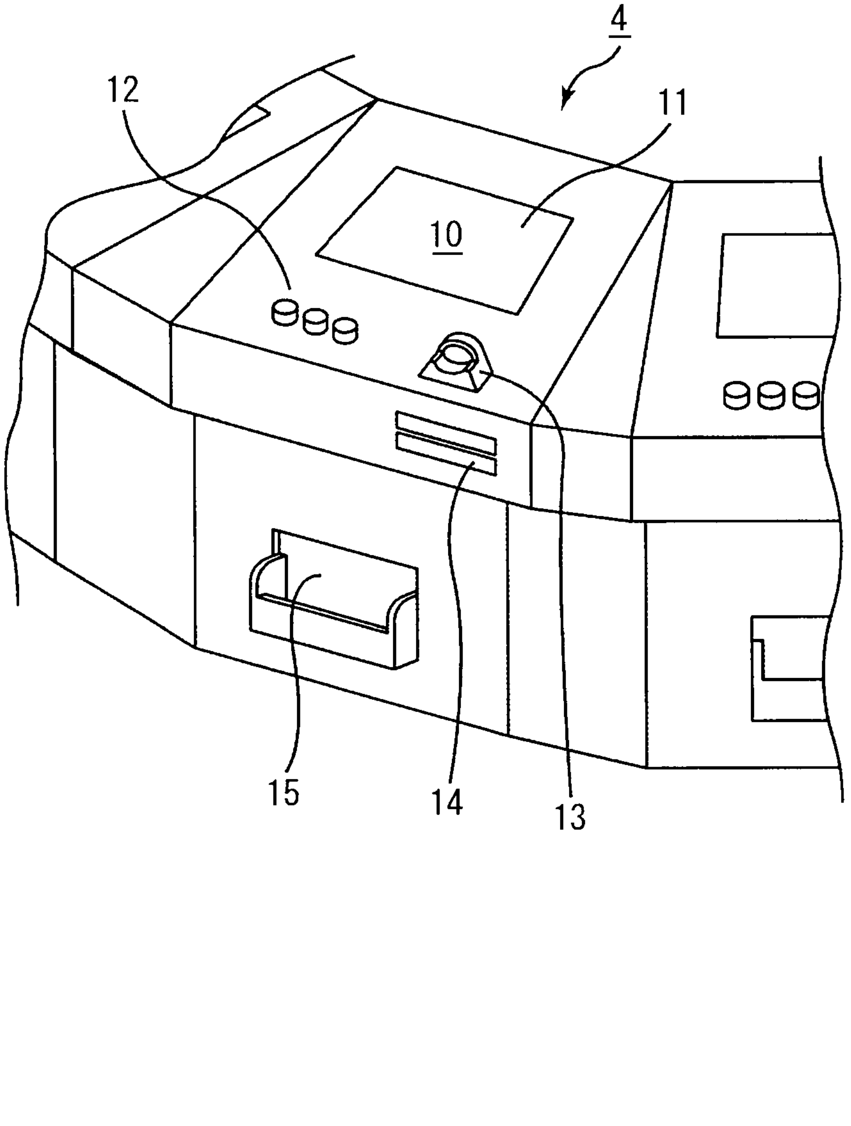
FIG. 3 is an outline view of a player terminal in one embodiment of the present invention.

FIG. 3 is an outline view illustrating one player terminal 4 according to one embodiment of the present embodiment.

Each of the player terminals 4 constituting the table portion 2 has the same structure.

As shown in FIG. 3, one player terminal 4 includes the liquid crystal display 10, the touch panel 11, operation buttons 12, a coin insertion slot 13, a bill insertion slot 14, and a coin exit 15. The liquid crystal display 10 is a display device that displays a game screen (see FIG. 1 and FIG. 6), the results of the game or the like described later. The touch panel 11 is arranged on the front face of the liquid crystal display 10. The touch panel 11 is used to select a bet target or to set a bet amount with a game screen 70 displayed on the liquid crystal display 10. That is, the touch panel 11 functions as an operating unit for selecting the bet target or setting the bet amount. The operation buttons 12 are operating units for making operations such as a payout operation in the gaming machine 1. The coin insertion slot 13 is a portion for a player to insert coins or medals. The bill insertion slot 14 is a portion for a player to insert bills. Further, the coin exit 15 is a portion for paying out coins or medals corresponding to accumulated credits when a player makes a payout operation.

The panel portion 3 constituting the gaming machine 1 includes a front display 21, speakers 22, and LEDs 23. The front display 21 is a display device that displays an image in accordance with the progress of the game. Specifically, the front display 21 displays images such as an image of a dealer distributing cards or exchanging chips. The front display 21 also displays the fronts of distributed cards. The speakers 22 output music and/or sound effects in accordance with the progress of the game. These speakers 22 are set up at the upper portion of the front display 21. The LEDs 23 are a light emitting device that is lit at the time of various effects, and enhances the sense of reality of the game by emitting light in various modes for the effects.

Next, the structure according to a control system of the gaming machine 1 will be described in detail with reference to an accompanying drawing.

Figure 4:
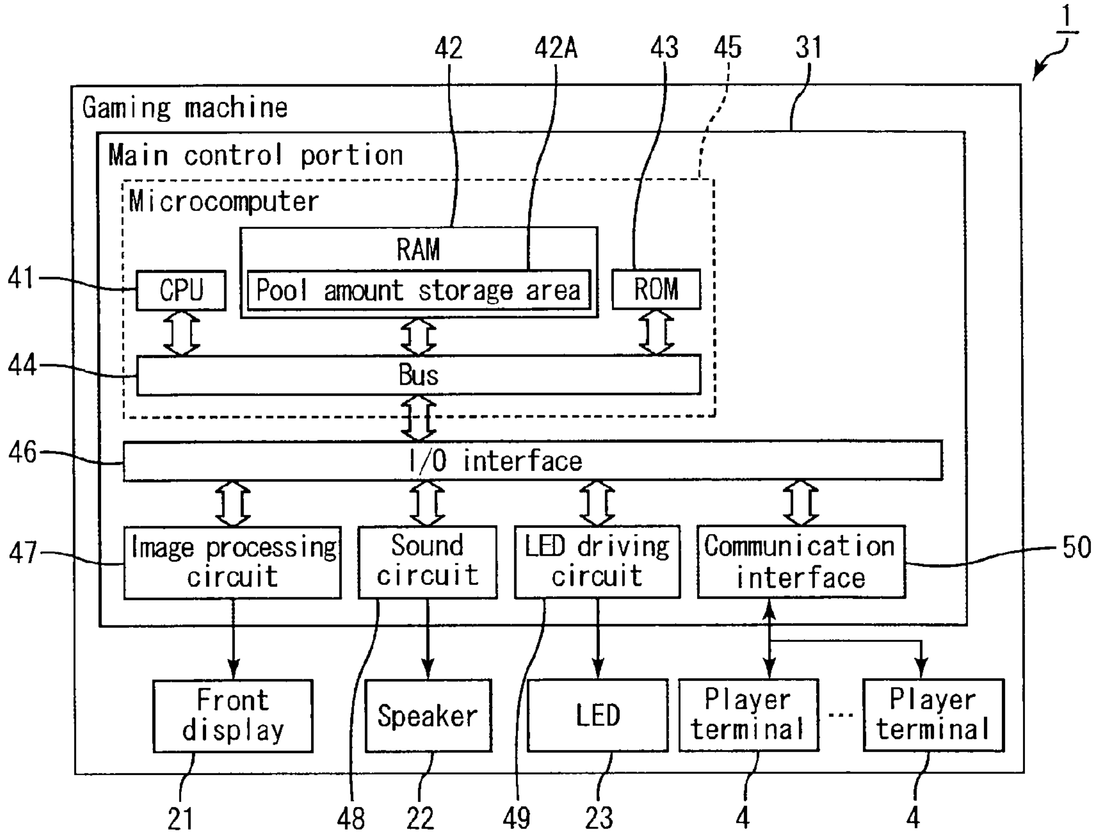
FIG. 4 is a block diagram schematically illustrating a control system of the gaming machine according to one embodiment of the present invention.

FIG. 4 is a block diagram schematically illustrating a control system of the gaming machine according to one embodiment of the present invention.

As illustrated in FIG. 4, the gaming machine 1 includes a main control portion 31, the plurality of player terminals 4 connected to the main control portion 31, and a variety of peripheral devices.

The main control portion 31 basically includes a microcomputer 45 as a core. This microcomputer 45 includes a CPU 41, a RAM 42, a ROM 43, and a bus 44 for transmitting data among the CPU 41, the RAM 42 and the ROM 43. The ROM 43 stores various programs necessary for executing processing to control the gaming machine 1, and data tables. The CPU 41 is a calculating unit that executes various control programs. The CPU 41 is primarily responsible in control of the respective driving circuits by the microcomputer 45. The RAM 42 is a memory for temporarily storing a variety of data calculated by the CPU 41. The ROM 43 stores image data of the fronts and the backs of cards used as the player cards and the dealer cards.

The ROM 43 also stores a blackjack game program for controlling the progress of a blackjack game and determining the result of the black jack game, based on the above blackjack game rules. The Blackjack game program corresponds to the card game program of the present invention and the ROM 43 corresponds to the memory of the present invention.

The RAM 42 stores number-of-jackpot data indicative of the number of jackpots.

The CPU 41 is also connected through an I/O interface 46 to an image processing circuit 47, a sound circuit 48, an LED driving circuit 49, and a communication interface 50. The image processing circuit 47 is a circuit for controlling a display mode of the front display 21, based on control by the CPU 41. Therefore, performing a display control of the front display 21 through the image processing circuit 47 displays images such as a dealer image 102 on the front display 21 (see FIG. 7). The sound circuit 48 is a circuit for performing a drive control of the speakers 22, based on control by the CPU 41. In other words, controlling the speakers 22 through the sound circuit 48 outputs the music and sound effects according to the progress of the game. The LED driving circuit 49 is a circuit for controlling illumination modes of the LEDs 23. Therefore, controlling the illumination modes of the LEDs 23 through the LED driving circuit 49 enables production of effects corresponding to the progress of the game.

The communication interface 50 is an interface that allows each player terminal 4 to transmit and receive various data to and from a main control portion 31. Therefore, a variety of information such as betting operation information from each player terminal 4 is transmitted and received to and from the main control portion 31 through the communication interface 50.

Next, the control system of the player terminals 4 according to the present embodiment will be described in detail with reference to an accompanying drawing.

Figure 5:
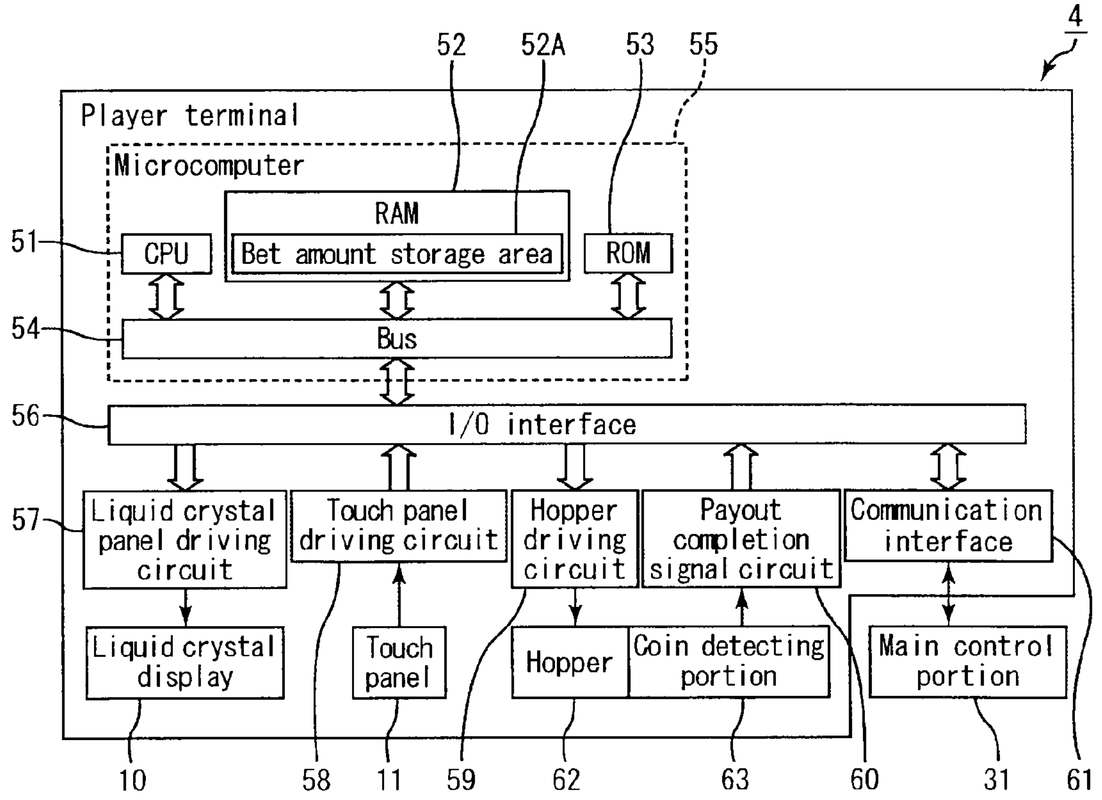
FIG. 5 is a block diagram schematically illustrating a control system of each player terminal according to one embodiment of the present invention.

FIG. 5 is a block diagram schematically illustrating the control system of each player terminal 4 according to one embodiment of the present invention.

As illustrated in FIG. 5, each player terminal 4 according to the present embodiment includes a microcomputer 55 as a core. The microcomputer 55 includes a CPU 51, a RAM 52, a ROM 53, and a bus 54 for transmitting data among the CPU 51, the RAM 52, and the ROM 53. The ROM 53 stores various programs necessary for executing processing to control the player terminal 4, and data tables.

The CPU 51 is a calculating unit that executes a variety of control programs stored in the ROM 53. The CPU 51 is primarily responsible in control of the respective driving circuit by the microcomputer 55. The RAM 52 is a memory for temporarily storing a variety of data calculated by the CPU 51. The RAM 52 has a bet amount storage area 52A provided therein. The bet amount storage area 52A stores the number of credits currently accumulated in the player terminal 4, a bet target betted by a player (i.e. normal bet or side bet), and the bet amount (the number of credits) betted on the bet target.

The CPU 51 is connected through an I/O interface 56 to a liquid crystal panel driving circuit 57, a touch panel driving circuit 58, a hopper driving circuit 59, a payout completion signal circuit 60, and a communication interface 61. The liquid crystal panel driving circuit 57 is connected to the liquid crystal display 10, and is used for controlling display modes of the liquid crystal display 10. The touch panel driving circuit 58 is connected to the touch panel 11, detects the operation of the touch panel 11 by a player, and is used for providing control that corresponds to the operation. The hopper driving circuit 59 is connected to a hopper 62, and is used for controlling the hopper 62 at the time of paying out coins to the coin exit 15. The payout completion signal circuit 60 is connected to a coin detecting portion 63. Upon payout of a predetermined number of coins to the coin exit 15, the payout completion signal circuit 60 transmits a payout completion signal indicating that payout has completed.

The communication interface 61 is an interface that allows the player terminal 4 to transmit and receive a variety of information to and from the main control portion 31. For example, bet information based on operation information outputted from the touch panel 11 is transmitted to the main control portion 31 through the communication interface 61.

Next, with reference to the accompanying drawings, a detailed description will be given with respect to the game screen 70 displayed on the liquid crystal display 10 of the player terminal 4 when the Blackjack game is executed in the gaming machine 1 according to the present embodiment.

FIG. 6 is an explanatory view illustrating a game screen displayed on the liquid crystal display of the player terminal.

In this context, in the gaming machine 1 according to the present embodiment, the player makes a betting operation by using the game screen 70 and the touch panel 11. This betting operation is an operation of betting or side-betting a predetermined amount of credits to a current game. Similarly, by using the game screen 70 and the touch panel 11, the player can make an operation for requesting the player additional card or an operation of increasing the bet amount.

As shown in FIG. 6, the game screen 70 includes a player's card display area 71, a side game-related information display area 305, and an information display area for displaying various operating buttons and player's information.

The player's card display area 71 is an area for displaying the cards distributed to the player in a Blackjack game (see FIG. 1B).

Various operating buttons including a bet amount button image 75, a Repeat bet button image 76, a normal bet button image 73, a side bet button image 86 and the like; and player information including a bet amount display area 90 are displayed in the information display area.

The player's card display area 71 displays the normal bet button image 73 in its lower portion.

In the case of placing a normal bet, the player selects a bet amount by touching a portion on the touch panel 11 corresponding to any of the bet amount buttons 75, and then, sets the bet amount (normal bet amount) to the Blackjack game by touching a portion on the touch panel 11 corresponding to the normal bet button image 73.

The bet amount determined by operating the bet amount button and the normal bet button is transmitted to the main control portion 31.

The side bet button image 86 is displayed to the left of the normal bet button image 73.

The player can place a side bet by touching a portion on the touch panel 11 corresponding to the side bet button image 86.

In addition, to the lower right hand side of the normal bet button image 73, a plurality of bet amount button images 75 (three button images of "1 credit", "10 credits", and "100 credits" in the present embodiment) are displayed. The player can set the bet amount to be betted as a normal bet to the current Blackjack game by touching a position on the touch panel 11 corresponding to any of the BET amount button images 75.

In the present description, the button images such as the normal bet button image 73 and the side bet button image 86 are also referred to simply as buttons herein.

Touching a position on the touch panel 11 corresponding to any of the button images is also referred to as "pressing (turning on) a button". For example, touching a position on the touch panel 11 corresponding to the side bet button image 86 is also referred to as "pressing (turning on) the side bet button". Further, touching a position on the touch panel 11 corresponding to a button image is also referred to as "touching the button" and "operating the button".

Above the BET amount button images 75, a Repeat bet button image 76 and an UNDO bet button image 77 are displayed. The player can bet a bet amount equal to that of the previous game by touching the Repeat bet button. In addition, the player can cancel the betting operation that has already been made, by touching the UNDO bet button.

Below the normal bet button image 73 and the side bet button image 86, a plurality of operating button images are displayed. These operating button images are used by the player to carry out the underlying strategy with the dealer. Specifically, as operating button images, a STAND button image 78, a HIT button image 79, a SURRENDER button image 80, an INSURRANCE button image 81, a SPLIT button image 82, and a Double Down button image 83 are arranged.

The STAND button 78 is operated at the time of playing a game against the dealer with cards currently distributed without requesting distribution of additional cards. The HIT button 79 is operated when an additional card is newly requested in addition to the currently distributed cards, namely, when a player additional card is requested. The HIT button 79 can be used until a total of the numbers displayed on the distributed cards is equal to or greater than "21".

The SURRENDER button 80 is operated at the time of withdrawal from the current game. When the SURRENDER button 80 is operated, half of the normal bet amount at that time is collected, and the remaining normal bet amount is returned to the player. The INSURANCE button 81 is operated when the player applies insurance for a case in which cards distributed to the dealer makes a hand of Blackjack.

The SPLIT button 82 is operated in the case where numbers displayed on two cards distributed in the game are the same, and the cards are divided into two hands. When the SPLIT button 82 is operated, the player can play a game against the dealer by two or more hands. The Double Down button 83 is operated in the case where the player doubles the normal bet amount in the game. When the Double Down button 83 is operated, the player receives a player additional card to play a game against the dealer.

In addition, below the STAND button image 78, a HELP button image 84 is displayed. The HELP button 84 is operated to display an operating method of the gaming machine 1 on the liquid crystal display 10. In addition, on the right side of the HELP button image 84, a message area 85 is arranged. A message supporting the progress of the game is displayed in this message area 85.

On the lower portion of the game screen 70, a normal bet amount display area 90, an acquired amount display area 91, an owned credit display area 92, a bet amount lower limit display area 93, a bet amount upper limit display area 94, and a side bet amount display area 97 are arranged. A normal bet amount betted by the player to the current Blackjack game is displayed in the normal bet amount display area 90. The number of credits acquired as an award by the player is displayed in the acquired amount display area 91. Then, the number of credits currently owned by the player is displayed in the owned credit display area 92. A lower limit of the bet amount that can be betted by the player is indicated in the bet amount lower limit display area 93, and an upper limit of the bet amount that can be betted by the player is indicated in the bet amount upper limit display area 94. A side bet amount that is side-betted by the player to the current game is displayed in the side bet amount display area 97.

In addition, on the left side of the player card display area 71, a side game-related information display area 305 is arranged. The side game-related information display area 305 displays images related to the side game therein, such as the side bet image 301, the number-of-jackpot image 302, the side-game-result image 95, and the side payout image 304 (see FIG. 1A and FIG. 1C).

Next, with reference to the accompanying drawings, a detailed description will be given with respect to amain screen 101 displayed on the front display 21 when a Blackjack game is played in the gaming machine 1 according to the present embodiment.

Figure 7:
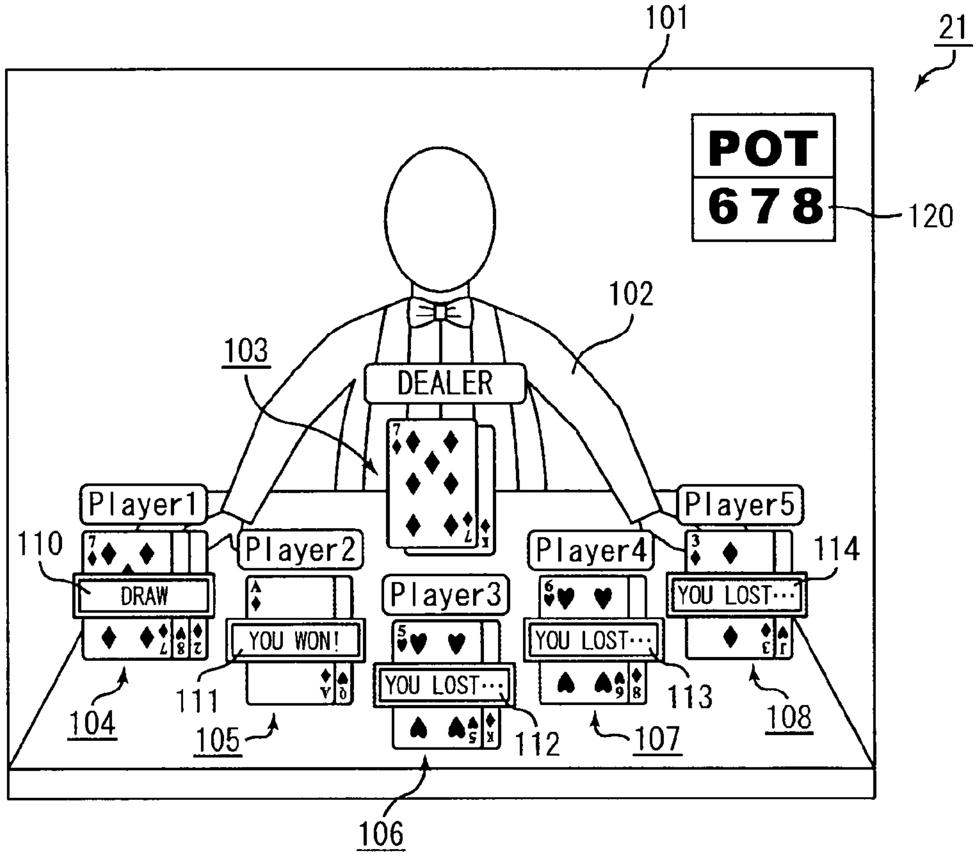
FIG. 7 is an explanatory view of a main screen displayed on a front display.

FIG. 7 is an explanatory view of the main screen displayed on the front display.

In the gaming machine 1 according to the present embodiment, on the main screen 101, various images are displayed together with the progress of the game. Specifically, a dealer image 102 is displayed on the main screen 101, and the dealer who carries out card distribution or the like is expressed by an animation. By displaying such main screen 101, the gaming machine 1 gives the sense of reality to the player of the game.

In addition, on the substantially center portion of the main screen 101, dealer cards 103 are displayed. The dealer cards 103 indicate the cards distributed to the dealer. Further, on the lower portion of the main screen 101, player cards 104 to 108 indicating the player cards of respective players (a maximum of 5 players) who play the game at the player terminals 4 and the winning and losing result images 110 to 114 indicating winning and losing between each of the players and the dealer are displayed. Therefore, the player can know types of cards distributed to the dealer and types of cards distributed to the other players who play the game at the same time by referring to the main screen 101. Further, the player can know the result of winning and losing of the other players together with the result of one's own winning and losing by referring to the main screen 101.

On the upper right portion of the main screen 101, a POT image 120 is displayed. The POT image 120 shows the current number of jackpots. The player can check the POT image 120 to know the current number of jackpots.

Next, with reference to the accompanying drawings, a detailed description will be given with respect to a game processing program executed by the CPU 41 of the main control portion 31, and a game processing program at the player terminal side executed by the CPU 51 of the player terminal 4 in the gaming machine 1 having the above construction according to the present embodiment.

First, with reference to FIG. 8 to FIG. 9, the game processing program executed by the main control portion 31 will be described.

When the main control portion 31 starts the game processing program, the CPU 41 first transmits a bet period start command to each player terminal 4 (step S1). This normal bet period start command is a command for starting acceptance of a normal bet operation by the player at each player terminal 4.

After that, when the current step proceeds to step S2, the CPU 41 receives bet information transmitted from each player terminal 4. In this context, the bet information includes information relating to the bet target and the bet amount (number of credits). Upon the reception of the bet information, the CPU 41 stores the bet information in the RAM 42 in association with each player terminal 4, and then, shifts the processing to step S3.

Next, the CPU 41 updates the number of jackpots (step S3). In the case where the bet information having received in step S2 includes information that a side bet has been placed (side bet information), the CPU 41 adds the number of credits (one in the present embodiment) corresponding to the side bet amount to the number of jackpots indicated by the number-of-jackpot data stored in the RAM 42 in this processing.

As above, 100% of the side-betted credit is added to the number of jackpots in the present embodiment. However, in the present invention, percentage of the side-betted credit to be added to the number of jackpots is not particularly limited, and it may be 10%, for example.

Subsequently, the CPU 41 transmits information indicative of the number of jackpots updated in step S3 (number-of-jackpot information) to the player terminal 4 from which the side bet information has been transmitted (step S4).

After that, the CPU 41 carries out player initial card lottery processing (step S5). The player initial card lottery processing (step S5) is a processing for determining cards associated with each player and dealer by means of lottery. In Blackjack games, six decks or eight decks of playing cards are used. One deck has 52 cards each of which is assigned with one of the numbers and one of the suits described above. Therefore, in the player initial card lottery processing (step S5), the CPU 41 randomly associates any of numbers from 1 to N (distribution order) with N cards (for example, N=312 in the case where six decks of cards are used) used in one game. The CPU 41 associates cards with the dealer and each player based on the thus-determined distribution order (in other words, the dealer cards are distributed to the dealer and the player initial cards or the player additional card are distributed to each player).

Following the player initial card lottery processing (step S5), in step S6, the CPU 41 transmits player initial card information to the player terminal 4 that has transmitted the normal bet information, based on a lottery result of the player initial card lottery processing (step S5). In this context, the player initial card information is information relating to two cards to be first distributed to each player who participates in the Blackjack game. Namely, the player initial card information includes information indicating numbers and suits of two cards to be first distributed (such as "7 of Hearts", "A of Spades", for example).

After the player initial card information has been transmitted to the player terminal 4 at which the normal bet has been placed, the CPU 41 executes dealer's image effect processing (step S7). Specifically, the CPU 41 controls the front display 21 and carries out an effect of displaying an image of the dealer who distributes two cards respectively to the player and the dealer on the main screen 101 (refer to FIG. 7). The number and suit of the second card distributed to the dealer are not displayed at the time when the card is distributed.

Next, the CPU 41 executes selection-information reception processing (step S8). The selection-information reception processing is specifically described later with reference to FIG. 14.

In the following step S9, the CPU 41 receives card determination information transmitted from each player terminal 4. The card determination information is transmitted to the main control portion 31 by way of selection of the STAND button 78, the SURRENDER button 80, or the Double Down button 83 at the player terminal 4.

Upon receipt of the card determination information, the CPU 41 determines whether or not the total of the numbers displayed on the cards distributed to the dealer is "17" or greater (step S10).

When determining the total of the numbers is smaller than "17", the CPU 41 determines a card to be distributed to the dealer and displays the determined card on the front display 21 (step S11). Then, the CPU 41 shifts the processing to step S10.

When determining that the total of the numbers is "17" or greater, the CPU 41 executes the normal game result determination processing (step S12). In this processing, the CPU 41 compares the cards distributed to the dealer (dealer cards) and cards distributed to each player (player cards) to judge winning and losing (result of the normal game) between each player and the dealer. Specifically, the total of the numbers displayed on the dealer cards and the total of the numbers displayed on the player cards are calculated, and the one having the cards with the total of numbers closer to "21" without exceeding "21" is determined to be a winner. In the case where the total of numbers of the player cards and the total of numbers of the dealer cards are the same, the CPU 41 judges the game to be a draw.

When the SPLIT button is turned on at any of the player terminals 4, the CPU 41 determines the normal game result of this player terminal 4 for each pair of the split player cards. The CPU 41 determines whether or not a SPLIT flag is set so as to determine whether or not the SPLIT button is turned on at the player terminal 4. The CPU 41 sets a SPLIT flag upon receiving a SPLIT selection signal from any of the player terminals 4, in association with the player terminal 4 as the transmission source of the SPLIT selection signal.

When a player at any of the player terminals 4 has turned the INSURANCE button on and the two dealer cards form "blackjack" (when the two cards are an "A" card and a card valuing 10), the CPU 41 includes a refund of the normal bet credits, in the normal game result of the player terminal 4. The CPU 41 determines whether or not an INSURANCE flag is set so as to determine whether or not the INSURANCE button is turned on at the player terminal 4. The CPU 41 sets an INSURANCE flag upon receiving an INSURANCE selection signal from any of the player terminals 4, in association with the player terminal 4 as the transmission source of the INSURANCE selection signal.

When the player has turned the SURRENDER button on at any of the player terminals 4, the CPU 41 includes a refund of the normal bet credits to the player regardless of what the dealer cards are, in the normal game result at the player terminal 4. The CPU 41 determines whether or not a SURRENDER flag is set so as to determine whether or not the SURRENDER button is turned on at the player terminal 4. The CPU 41 sets a SURRENDER flag upon receiving a SURRENDER selection signal from any of the player terminals 4, in association with the player terminal 4 as the transmission source of the SURRENDER selection signal.

Subsequently, in step S13, the CPU 41 transmits the normal game result information showing the normal game result determined in step S12 to each player terminal 4. The CPU 41 also calculates the number of credits (the number of payout credits) to be paid out in each player terminal 4, based on the normal game result of the player terminal 4 determined in step S12 and the normal bet amount of the player terminal 4. Then, the CPU 41 transmits information showing the calculated number of payout credits (number-of-payout-credits information) to each player terminal 4.

Then, as shown in FIG. 7, the CPU 41 displays winning and losing result images 110 to 114 indicating the result of winning and losing judgment of each player terminal 4 on the main screen 101 of the front display 21 (step S14). After displaying the result of the winning and losing judgment processing (step S14), the CPU 41 completes the game processing program in the main control portion 31.

Next, the game processing program executed at the side of the player terminal 4 will be described with reference to FIG. 8 and FIG. 9.

When execution of the game processing program is started, in step S101, the CPU 51 receives a bet period start command from the main control portion 31.

Thereafter, in step S102, the CPU 51 displays the game screen 70 (see FIG. 6) on the liquid crystal display 10 and executes bet input acceptance processing.

Here, the bet input acceptance processing is described with reference to FIG. 10.

Figure 10:
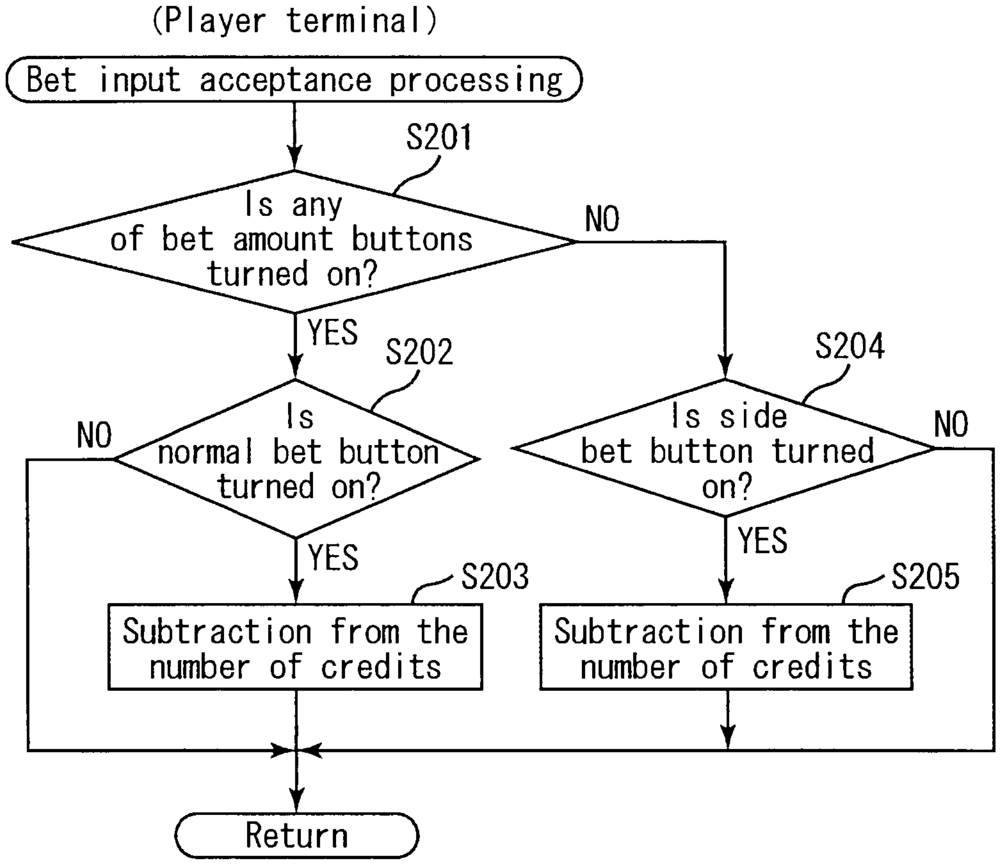
FIG. 10 is a flowchart illustrating a subroutine of bet input acceptance processing executed in each player terminal.

FIG. 10 is a flowchart illustrating a subroutine of bet input acceptance processing executed in each player terminal.

First, the CPU 51 determines whether or not any of the bet amount buttons has been turned on (step S201).

In the processing, the CPU 51 determines whether or not it has received a signal to be transmitted from the touch panel 11 when a player touches a position on the touch panel 11 corresponding to the "1 credit" button image, "10 credits" button image, or "100 credits" button image.

When determining that any of the bet amount buttons has been turned on, the CPU 51 determines whether or not the normal bet button has been turned on (step S202). In the processing, the CPU 51 determines whether or not it has received a signal to be transmitted from the touch panel 11 when the player touches a position on the touch panel 11 corresponding to the normal bet button image 73.

When determining that the normal bet button has been turned on, the CPU 51 subtracts a value corresponding to the bet amount button turned on in step S201 from the number of credits stored in the RAM 52, and then, stores the normal bet amount in the RAM 52.

When determining that the normal bet button has not been turned on in step S202, or after the processing of step S203, the CPU 51 ends the present subroutine.

When determining in step S201 that no bet amount button has been turned on, the CPU 51 determines whether or not the side bet button has been turned on (step S204). In the processing, the CPU 51 determines whether or not it has received a signal to be transmitted from the touch panel 11 when a player touches a position on the touch panel 11 corresponding to the side bet button image 86.

When determining that the side bet button has been turned on, the CPU 51 subtracts one from the number of credits stored in the RAM 52 (step S205). Then, the CPU 51 sets the side bet flag in the RAM 52.

When determining in step S204 that no side bet button has been turned on or after executing the processing of step S205, the CPU 51 ends the present subroutine.

In the above, the bet input acceptance processing (see step S102 of FIG. 8) has been described with reference to FIG. 10.

Now, refer back to FIG. 8.

In step S103, the CPU 51 determines whether or not a bet period has terminated. Specifically, the CPU 51 determines whether or not a predetermined given time (20 seconds, for example) has been passed after starting acceptance of the normal bet operation (i.e., reception of the bet period start command). In the case where the normal bet period has terminated (step S103: YES), the CPU 51 shifts the processing to step S104. On the other hand, in the case where the betting period has not terminated yet (step S103: NO), the CPU 51 continuously accepts the betting operation.

When the current step proceeds to step S104, the CPU 51 stores the current bet information in the RAM 52, and transmits the bet information to the main control portion 31. The bet information includes normal bet information showing the normal bet amount (the number of credits) betted by the player. Further, in the case that a side bet has been placed, the bet information also includes side bet information.

Next, the CPU 51 receives number-of-jackpot information from the main control portion 31 when the side bet has been placed (step S105).

Then, the CPU 51 displays the side bet image 301 in the side game-related information display area 305, and displays the number-of-jackpot image 302 based on the number-of-jackpot information received in the main control portion 31 (see FIG. 1A).

In step S106, the CPU 51 receives the player initial card information. The player initial card information here is information to be transmitted from the main control portion 31 to the player terminal 4 in step S6 and is about two cards associated with the player who plays the game at the player terminal 4. Therefore, the player initial card information includes information on numbers and suits of two player initial cards (such as "7 of Hearts", "A of Spades", for example). Upon the reception of the player initial card information, the CPU 51 displays the player initial cards in the player card display area 71 on the game screen 70, based on the player initial card information (step S107).

Subsequently, the CPU 51 executes the side game result determination processing (step S108). The side game result determination processing is described later in detail with reference to FIG. 11.

Then, the CPU 51 executes selection-input acceptance processing (step S109). The selection-input acceptance processing is specifically described later with reference to FIG. 12.

After executing the processing of step S109, the CPU 51 transmits card determination information to the main control portion 31 (step S110).

Next, when the current step proceeds to step S111, the CPU 51 receives normal game result information and the number-of-payout-credits information transmitted from the main control portion 31 in step S13. After that, the CPU 51 displays the result of winning and losing judgment at the player terminal 4 on the liquid crystal display 10, based on the received normal game result information (step S112). Specifically, in the case where the game result is a draw, the CPU 51 displays characters "DRAW" in a normal game-result display area (not illustrated) of the game screen 70. Similarly, the CPU 51 displays characters "YOU WON" in the case where the player has won the game, and displays characters "YOU LOST" in the case where the player has lost the game.

After displaying the result of the winning and losing judgment on the liquid crystal display 10, the CPU 51 executes normal game payout processing (step S113). The CPU 41 makes an addition of the credit or pays out coins based on the number-of-payout-credits information in this normal game payout processing (step S113).

Next, the CPU 51 executes side game payout processing (step S114). When the result of the side game determined in step S108 is "PERFECT BLACK", the CPU 51 makes an addition of the credit or pays out coins in accordance with the number of jackpots indicated by the number-of-jackpot information received in step S105 in this processing.

Subsequently, the side game result determination processing (see step S108 of FIG. 8) is described with reference to FIG. 11.

Figure 11:
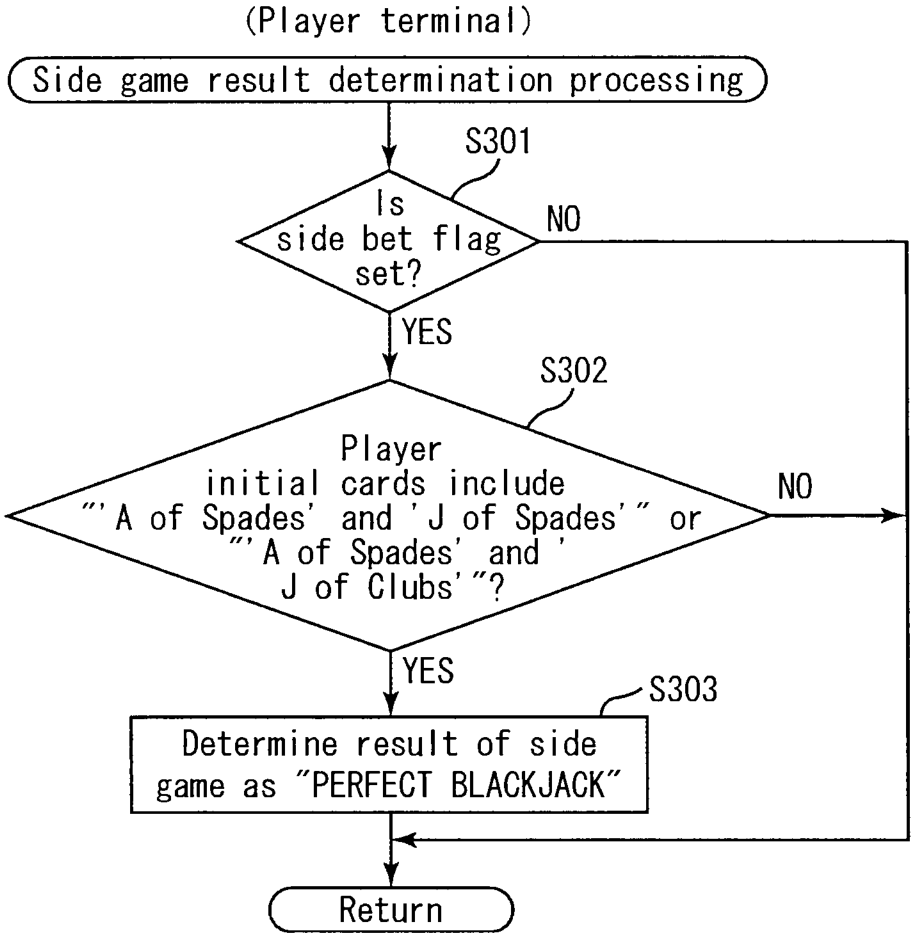
FIG. 11 is a flow chart illustrating a subroutine of side game result determination processing executed in each player terminal.

FIG. 11 is a flowchart illustrating a subroutine of side game result determination processing executed in each player terminal.

First, the CPU 51 determines whether or not the side bet flag is set in the RAM 52 (step S301).

When determining that the side bet flag is set, the CPU 51 determines whether or not the combination of two player initial cards is "'A of Spades' and 'J of Spades'" or "'A of Spades' and 'J of Clubs'" based on the player initial card information received in step S106 (step S302).

When determining that the combination of two player initial cards is "'A of Spades' and 'J of Spades'" or "'A of Spades' and 'J of Clubs'", the CPU 51 determines the result of the side game as "PERFECT BLACKJACK" (step S303).

In this processing, the CPU 51 displays an image of characters "PERFECT BLACKJACK" as the side game result image 95 in the side game-related information display area 305 of the liquid crystal display 10 (see FIG. 1C). In addition, the CPU 51 displays the side payout image 304 in the side game-related information display area 305 of the liquid crystal display 10 based on the number-of-jackpot information received in step S105 of FIG. 8 (see FIG. 1C).

The CPU 51 ends the present subroutine when determining that the side bet flag is not set in step S301, when determining the combination of two player initial cards is not "'A of Spades' and 'J of Spades'" or "'A of Spades' and 'J of Clubs'", or after the processing of step S303.

As above, the side game result determination processing (see step S108 of FIG. 8) has been described with reference to FIG. 11.

Subsequently, the selection-input acceptance processing (see step S109 of FIG. 9) is described with reference to FIG. 12.

Figure 12:
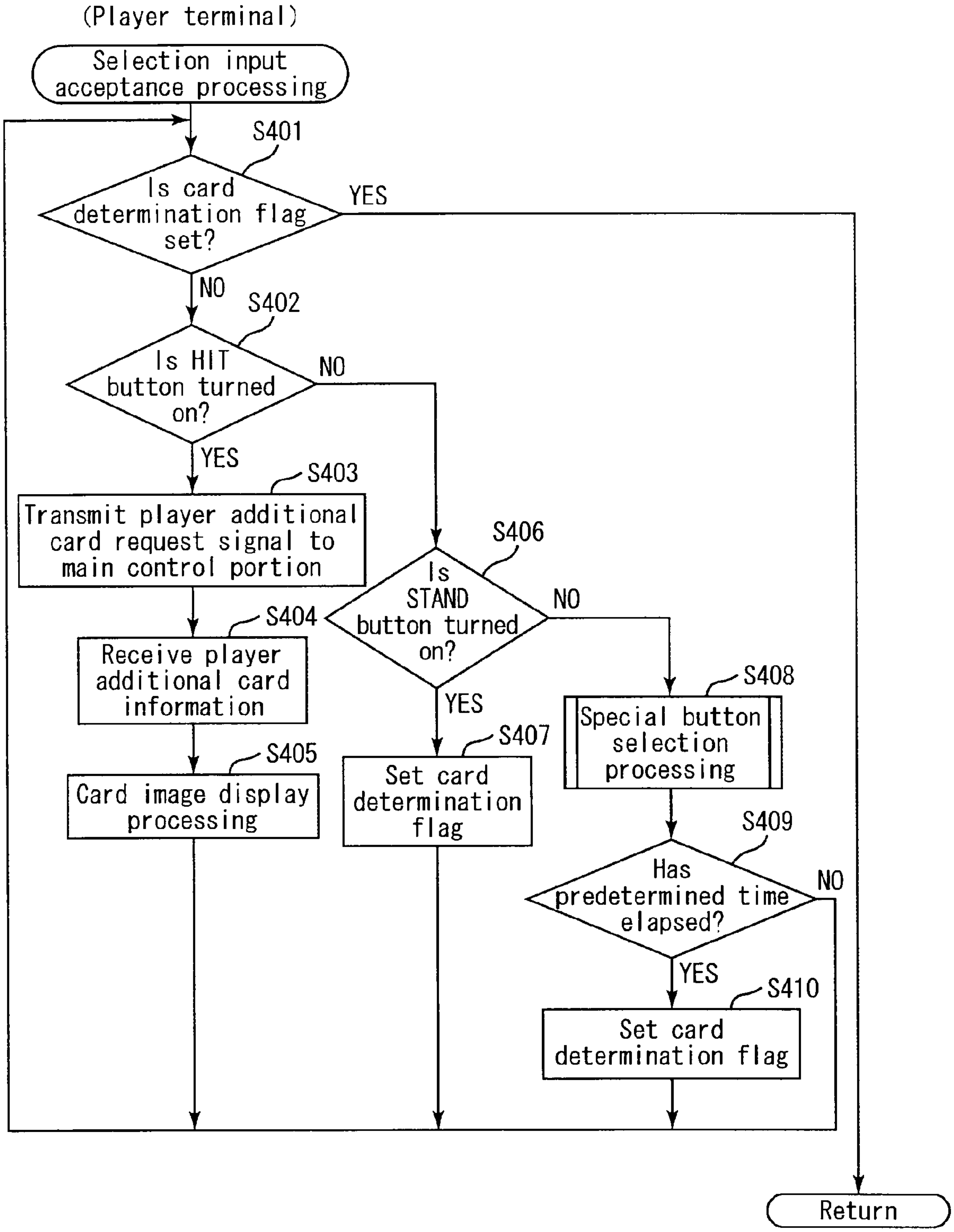
FIG. 12 is a flowchart illustrating a subroutine of selection-input acceptance processing executed in each player terminal.

FIG. 12 is a flowchart illustrating a subroutine of the selection-input acceptance processing executed in each player terminal.

First, the CPU 51 determines whether or not a card determination flag is set in the RAM 52 (step S401).

Figure 13:
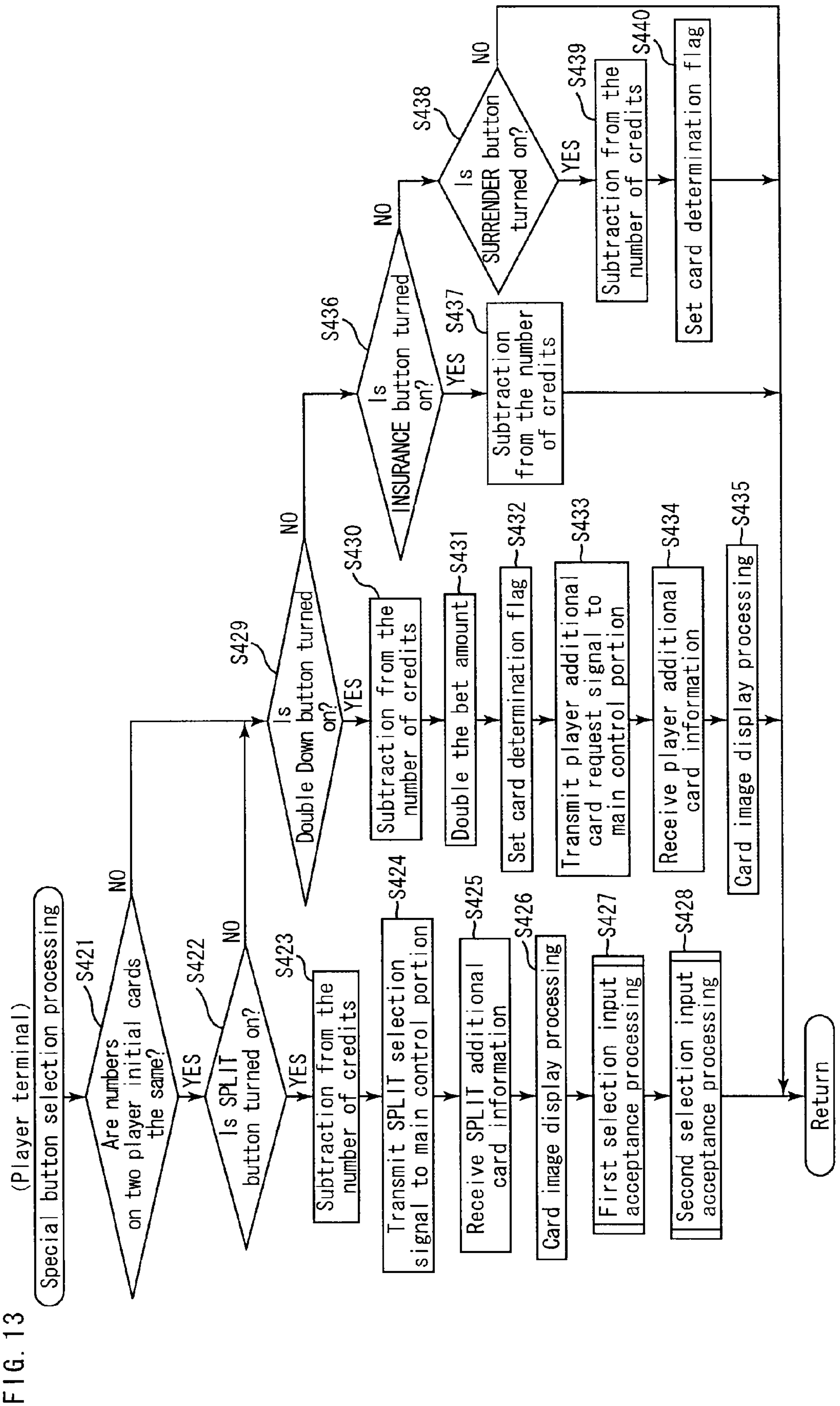
FIG. 13 is a flowchart illustrating a subroutine of special button selection processing executed in each player terminal.

The card determination flag is a flag that is set when the STAND button 78, the SURRENDER button 80, or the Double Down button 83 is turned on (see steps S407 and S410 of FIG. 12, and step S440 of FIG. 13). The card determination flag is cleared when the game concerned is completed (after the processing of step S114 of FIG. 9 has been executed).

When determining that the card determination flag is set, the CPU 51 ends the present subroutine.

On the other hand, when determining that the card determination flag is not set, the CPU 51 determines whether or not the HIT button has been turned on (step S402). In this processing, the CPU 51 determines whether or not it has received a signal to be transmitted from the touch panel 11 when the position on the touch panel 11 corresponding to the HIT button image 79 is touched.

When determining that the HIT button is turned on, the CPU 51 transmits a player additional card request signal to the main control portion 31 (step S403). Upon the reception of the player additional card request signal, the main control portion 31 determines a player additional card (see FIG. 14).

Next, the CPU 51 receives player additional card information from the main control portion 31 (step S404). The player additional card information indicates the player additional card.

Then, the CPU 51 executes card image display processing (step S405). In this processing, the CPU 51 displays the player additional card indicated by the received player additional card information in the player card display area 71 on the liquid crystal display 10.

After the processing of step S405, the CPU 51 shifts the processing to step S401.

When determining in step S402 that the HIT button is not turned on, the CPU 51 determines whether or not the STAND button is turned on (step S406). In this processing, the CPU 51 determines whether or not it has received a signal to be transmitted from the touch panel 11 when the position on the touch panel 11 corresponding to the STAND button image 78 has been touched.

When determining the STAND button is turned on, the CPU 51 sets the card determination flag in the RAM 52 (step S407). Thereafter, the CPU 51 shifts the processing to step S401.

When determining in step S406 that the STAND button is not turned on, the CPU 51 executes special button selection processing (step S408). The special button selection processing will be described later with reference to FIG. 13.

The CPU 51 then determines whether or not a predetermined time has passed after the side game result determination processing (see step S108 of FIG. 8) is executed (step S409).

When determining that the predetermined time has passed, the CPU 51 sets the card determination flag in the RAM 52 (step S410).

When determining in step S409 that the predetermined time has not passed yet or after the processing of step S410, the CPU 51 shifts the processing to step S401.

As above, the selection-input acceptance processing (see step S109 of FIG. 9) has been described with reference to FIG. 12.

Subsequently, the special button selection processing (see step S408 of FIG. 12) is described with reference to FIG. 13.

FIG. 13 is a flowchart illustrating a subroutine of the special button selection processing executed in each player terminal.

Figure 8:
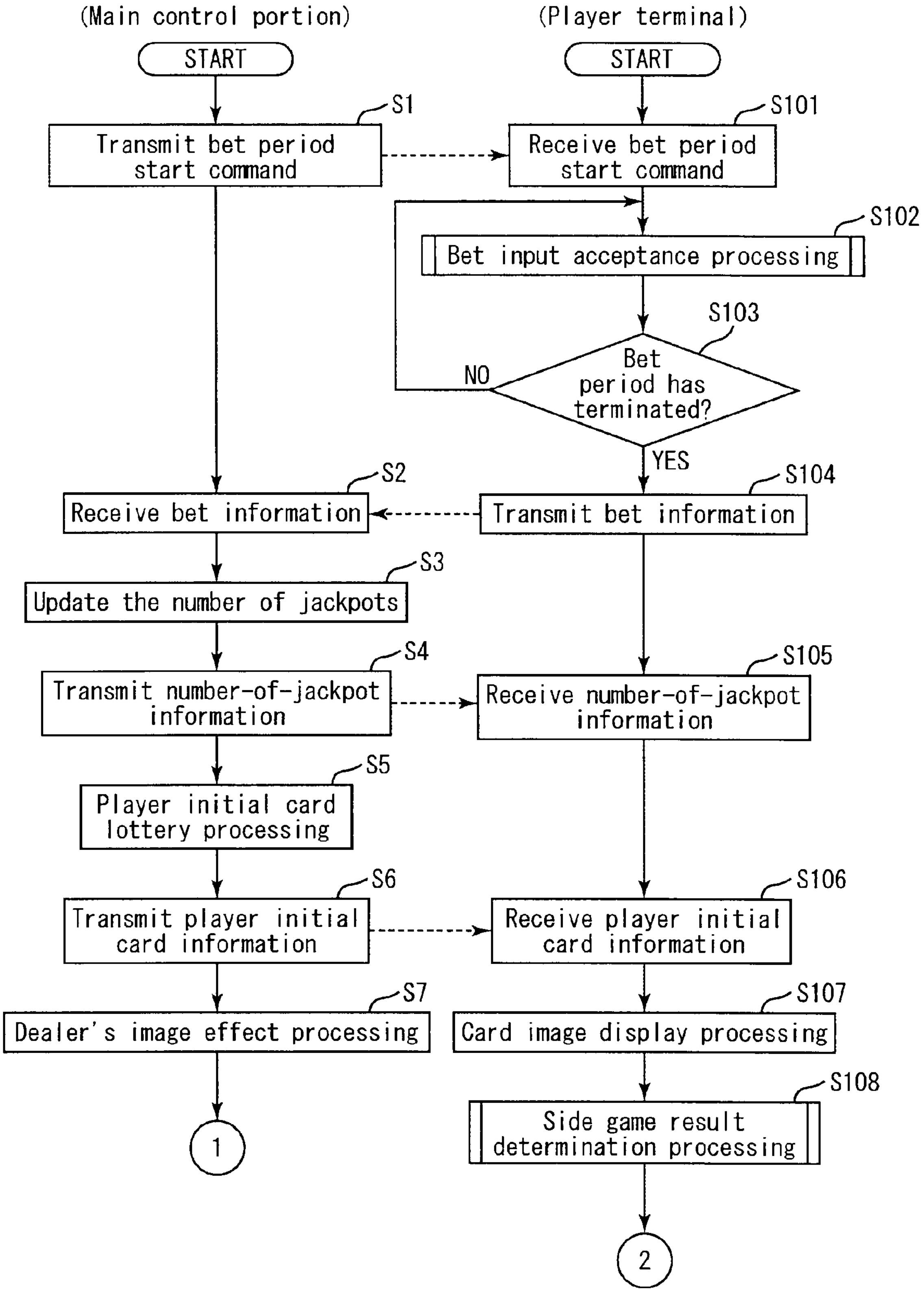
FIG. 8 is a flowchart of the game processing program of the gaming machine according to one embodiment of the present invention.

First, the CPU 51 determines whether or not the numbers on the two player initial cards are the same, based on the player initial card information received in step S106 of FIG. 8 (step S421).

When determining that the numbers on the two player initial cards are the same, the CPU 51 determines whether or not the SPLIT button is turned on (step S422).

In this processing, the CPU 51 determines whether or not it has received a signal to be transmitted from the touch panel 11 when a player touches the position on the touch panel 11 corresponding to the SPLIT button image 81.

When determining that the SPLIT button has been turned on, the CPU 51 subtracts the number of credits corresponding to the normal bet amount stored in the RAM 52, from the number of credits stored in the RAM 52 (step S423).

Next, the CPU 51 transmits a SPLIT selection signal to the main control portion 31 (step S424). Upon reception of the SPLIT selection signal, the main control portion 31 determines a SPLIT additional card (see FIG. 14).

Next, the CPU 51 receives SPLIT additional card information showing the SPLIT additional card from the main control portion 31 (step S425). The SPLIT additional card is a card to be paired with each of the split player initial cards. The respective split player cards are also referred to as a first player card and a second player card.

Next, the CPU 51 executes card image display processing (step S426). In this processing, the CPU 51 displays the SPLIT additional card shown by the received SPLIT additional card information in the player card display area 71 of the liquid crystal display 10.

The CPU 51 executes first selection-input acceptance processing for the first player card (step S427). Since the first selection-input acceptance processing is the same as the selection-input acceptance processing shown in FIG. 12, the descriptions thereof are omitted here.

The CPU 51 executes second selection-input acceptance processing for the second player card (step S428). Since the second selection-input acceptance processing is the same as the selection-input acceptance processing shown in FIG. 12, the descriptions thereof are omitted here.

Thereafter, the CPU 51 ends the present subroutine.

The CPU 51 determines whether or not the Double Down button has been turned on when determining the numbers allocated to two player initial cards are not the same in step S421, or when determining the SPLIT button has not been turned on in step S422 (step S429). In this processing, the CPU 51 determines whether or not it has received a signal to be transmitted from the touch panel 11 when the player touches the portion on the touch panel 11 corresponding to the Double Down button image 83.

When determining that the Double Down button has been turned on, the CPU 51 subtracts the number of credits corresponding to the normal bet amount stored in the RAM 52 from the number of credits stored in the RAM 52 (step S430).

Next, the CPU 51 doubles the normal bet amount (step S431). In this processing, the CPU 51 stores in the RAM 52 the amount obtained by doubling the normal bet amount currently stored in the RAM 52 as a new normal bet amount. In addition, the CPU 51 transmits information indicative of the new normal bet amount to the main control portion 31.

Next, the CPU 51 sets a card determination flag in the RAM 52 (step S432).

The CPU 51 then executes the processing of step S433 to step S435. The processing is the same as the processing of step S403 to step S405 of FIG. 12, and thus the descriptions thereof are omitted here.

After executing the processing of step S435, the CPU 51 ends the present subroutine.

When determining that the Double Down button has not been turned on in step S429, the CPU 51 determines whether or not the INSURANCE button has been turned on (step S436). In this processing, the CPU 51 determines whether or not it has received a signal to be transmitted from the touch panel 11 when the player touches the portion on the touch panel 11 corresponding to the INSURANCE button image 81.

When determining that the INSURANCE button has been turned on, the CPU 51 subtracts the number of credits half the normal bet amount stored in the RAM 52, from the number of credits stored in the RAM 52 (step S437).

Next, the CPU 51 transmits an INSURANCE selection signal to the main control portion 31.

Thereafter, the CPU 51 ends the present subroutine.

When determining that the INSURANCE button has not been turned on in step S436, the CPU 51 determines whether or not the SURRENDER button has been turned on (step S438). In this processing, the CPU 51 determines whether or not it has received a signal to be transmitted from the touch panel 11 when the player touches the portion on the touch panel 11 corresponding to the SURRENDER button image 80.

When determining that the SURRENDER button has been turned on, the CPU 51 subtracts the number of credits half the normal bet amount stored in the RAM 52, from the number of credits stored in the RAM 52 (step S439).

Next, the CPU 51 transmits a SURRENDER selection signal to the main control portion 31.

The CPU 51 sets a card determination flag in the RAM 52 (step S440).

When determining in step S438 that the SURRENDER button has not been turned on or after executing the processing of step S440, the CPU 51 ends the present subroutine.

In the above, the special button selection processing (see step S408 of FIG. 12) has been described with reference to FIG. 13.

The selection information reception processing (see step S8 of FIG. 9) is described with reference to FIG. 14.

Figure 14:
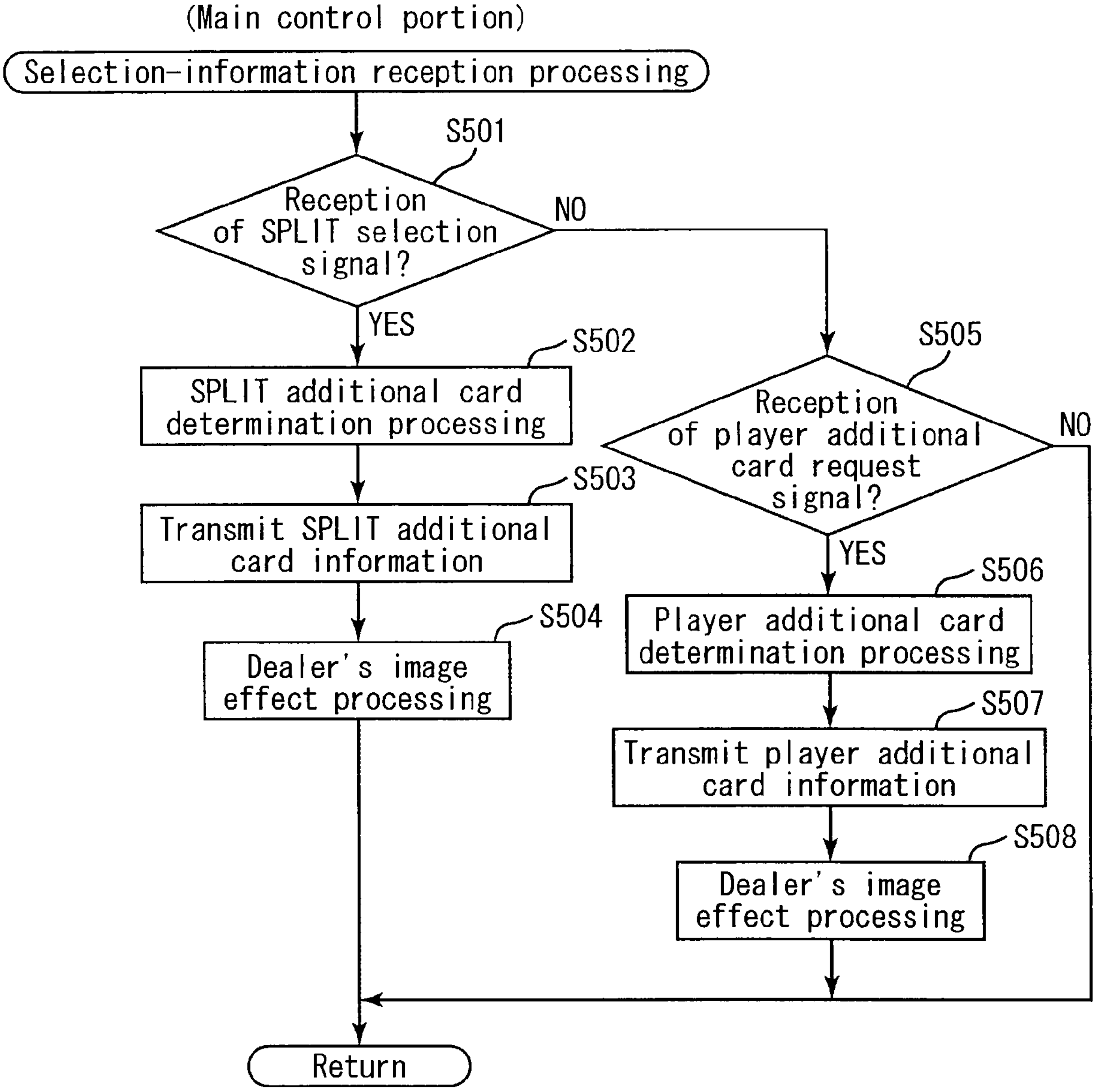
FIG. 14 is a flowchart illustrating a subroutine of selection-information reception processing executed in a main control portion.

FIG. 14 is a flowchart illustrating a subroutine of the selection information reception processing executed in the main control portion.

First, the CPU 41 determines whether or not it has received the SPLIT selection signal (see step S424 of FIG. 13) from any of the player terminal 4 (step S501).

When determining that it has received the SPLIT selection signal, the CPU 41 determines a SPPLIT additional card based on the distribution order determined in step S5 of FIG. 8 (step S502).

Next, the CPU 41 transmits information indicative of the determined SPLIT additional card (SPLIT additional card information) to the player terminal from which the SPLIT selection signal received in step S501 has been transmitted (step S503).

After that, the CPU 41 executes the dealer's image effect processing (step S7 of FIG. 8) and ends the present subroutine.

When determining in step S501 that it has not received the SPLIT selection signal, the CPU 41 determines whether or not it has received the player additional card request signal (see step S403 of FIG. 12 and step S433 of FIG. 13) from the player terminal 4 (step S505).

When determining that it has not received the player additional card request signal, the CPU 41 ends the present subroutine.

On the other hand, when the CPU 41 determines that it has received the player additional card request signal, the CPU 41 determines the player additional card, based on the distribution order determined in step S5 of FIG. 8 (step S506).

Next, the CPU 41 transmits information showing the determined player additional card (player additional card information) to the player terminal 4 as the transmission source of the player additional card request signal that the CPU 41 has received in step S505 (step S507).

Thereafter, the CPU 41 executes dealer's image effect processing (see step S7 of FIG. 8), and ends the present subroutine.

In the above, the first embodiment has been described with reference to FIG. 1 to FIG. 14.

According to the gaming machine 1 of the first embodiment, when the side bet has been placed, the side payout is offered based on the result of the side game. The result of the side game is determined based on the player initial cards. Namely, the player initial cards make a difference not only in the result of the Blackjack game, but also in the result of the side game (i.e. whether or not the player can get a side payout).

Accordingly, it is possible to increase the player's feeling of hope for good player initial cards and to please the player when the good player initial cards have been distributed to the player. As a result, a more interesting game can be offered.

Further, according to the gaming machine 1 of the first embodiment, the player operates buttons such as the HIT button and the STAND button to add the player additional card to the cards already distributed, and thereby makes the player cards. The result of the normal game is determined based on the thus-made player cards.

In this context, operation of buttons such as the HIT button and the STAND button makes a difference in the result of the normal game, namely, player's gaming skill affects the result of the normal game. On the other hand, the result of the side game is determined irrespective of the operation of buttons such as the HIT button and the STAND button. Therefore, the result of the side game is not affected by the player's gaming skill and is a matter of absolute chance. According to the gaming machine 1 of the first embodiment, the player can enjoy these two types of games.

Furthermore, according to the gaming machine 1 of the first embodiment, side-betted credit is cumulatively stored when the side bet has been placed. The side payout is offered based on the stored credit. Namely, the side-betted credit is the source of the side payout.

Accordingly, the player may be interested in how much credit has been stored. Further, the player winning the side game may feel that he or she has received the profit from the credit that is an accumulation of other players' side bets, so that the player enjoys a feeling of superiority. This may be an attractive point of the side game and encourages the player to place a side bet. Consequently, the side game becomes more exciting.

Moreover, according to the gaming machine 1 of the first embodiment, a number and a suit are allocated to the card. The result of the side game is determined by determining whether or not the combination of the numbers and the suits allocated to the player initial cards is a predetermined combination. Therefore, it is possible to have a player greatly interested in the combination of the numbers and the suits allocated to the player initial cards.

The above predetermined combination is a combination forming a hand of so-called Blackjack (e.g. a combination of "A" and "J") in the Blackjack game. Therefore, when the player has the player initial cards allocated with the numbers and the suits which make up the predetermined combination, it is highly possible that the player gets both the first payout and the second payout. Accordingly, it is possible to make the player have a strong feeling of hope for receiving the player initial cards allocated with the numbers and the suits which make up a predetermined combination. In the case where the player receives the player initial cards allocated with the numbers and the suits which make up a predetermined combination, it is possible to offer a great satisfaction to the player. As a result, the player may be more absorbed in the game.

[Second Embodiment]

In the following, the same reference numerals are given to the components identical to the components of the gaming machine 1 according to the first embodiment.

Descriptions are omitted for parts in the second embodiment to which descriptions in the first embodiment are applicable.

In the first embodiment, there has been described a case where the side payout is offered only when "'PERFECT BLACKJACK' is established". On the other hand, in the second embodiment, the case will be described where the side payout is offered not only when "PERFECT BLACKJACK" is established, but also when "NORMAL BLACKJACK" is established. Establishment of "NORMAL BLACKJACK" refers to a case where "PERFECT BLACKJACK" is not established when two player initial cards include a card of "A" and a card of "10", "J", "Q", or "K".

In the first embodiment, there has been described a case where the side payout is offered after the result of the Blackjack game (normal game) is determined and the payout in the normal game is paid out. On the other hand, in the second embodiment, a case is described where the side payout is offered before the result of the normal game is determined.

Figure 15A:
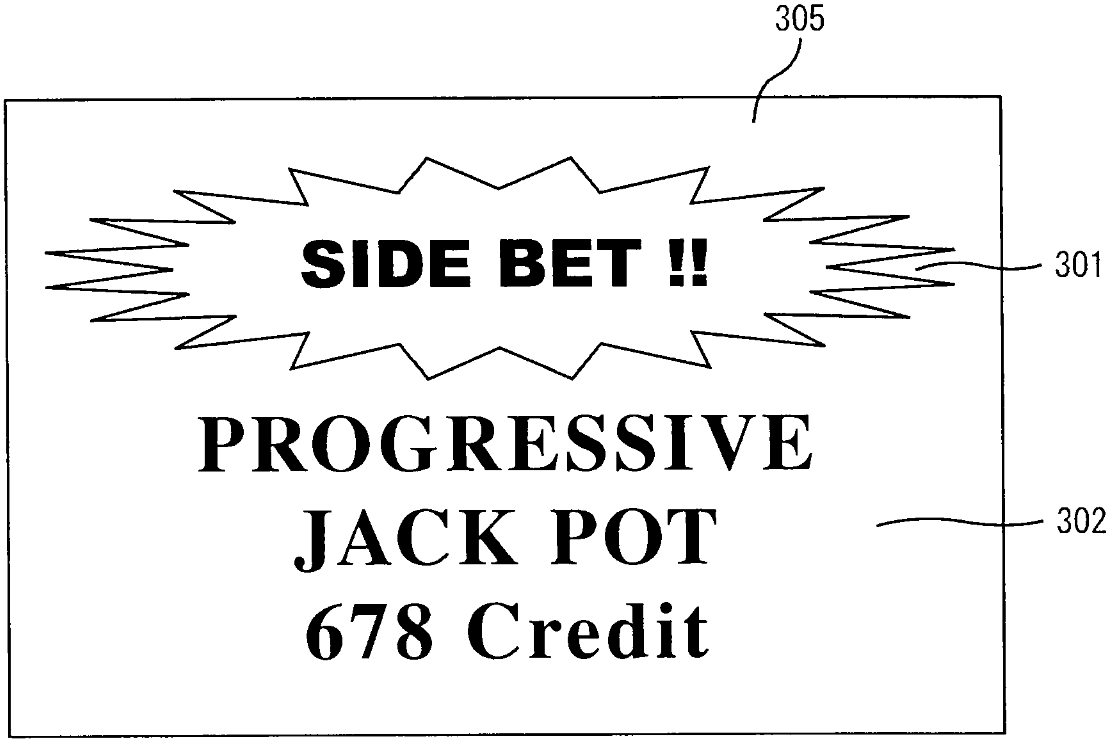
FIG. 15A is a view illustrating an exemplary image displayed on a liquid crystal display in a gaming machine according to a second embodiment.
Figure 15B:
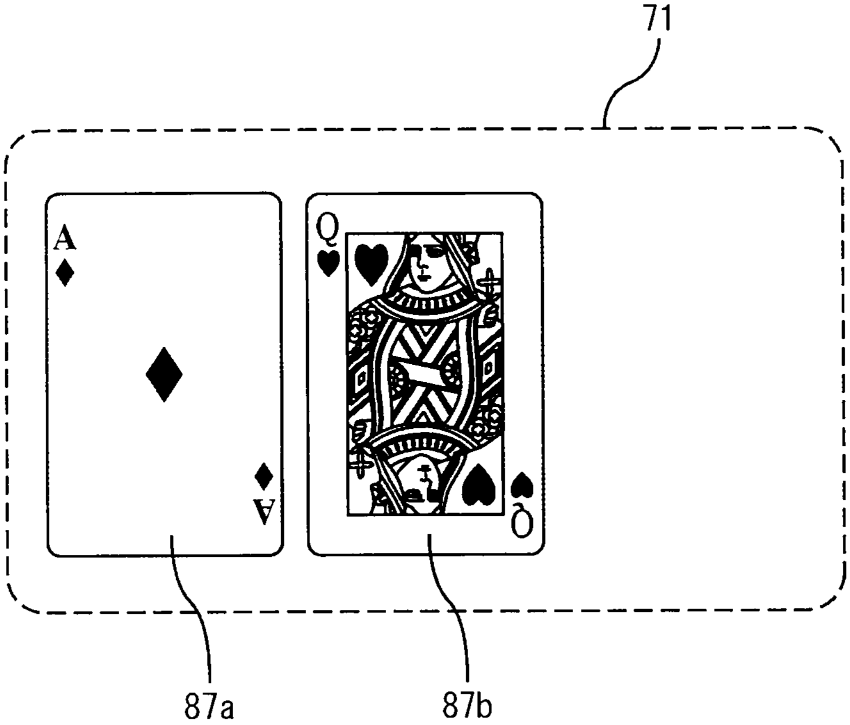
FIG. 15B is a view illustrating an exemplary image displayed on a liquid crystal display in a gaming machine according to the second embodiment.
Figure 15C:
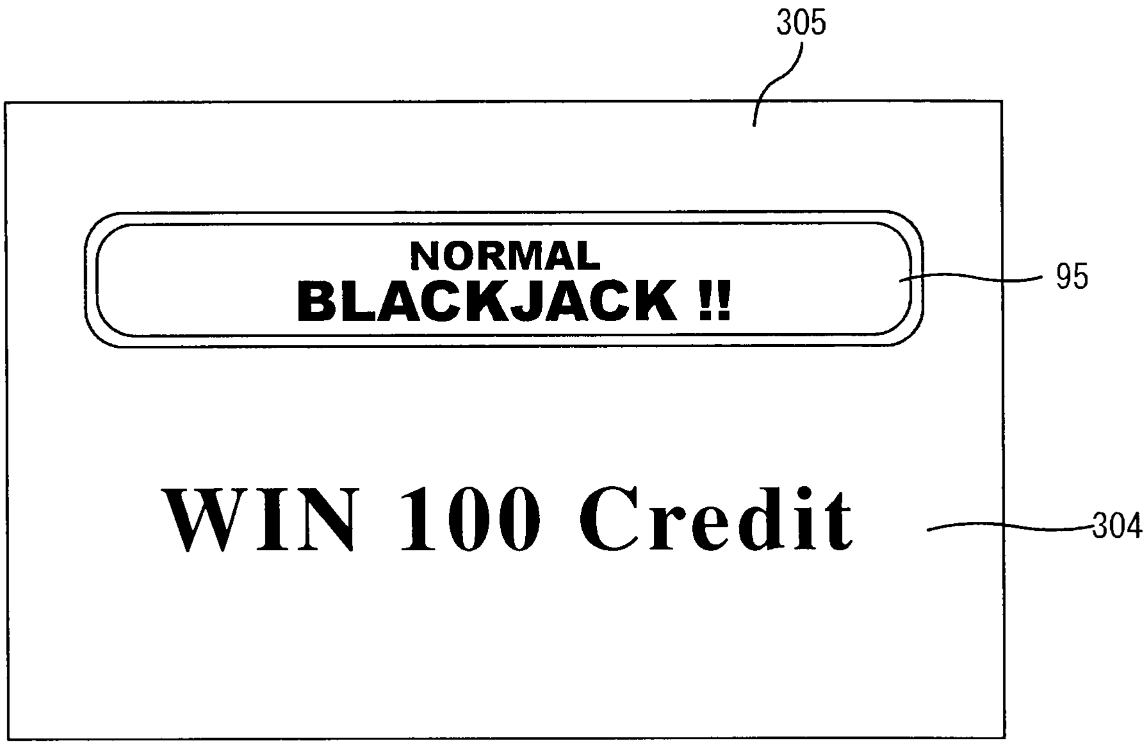
FIG. 15C is a view illustrating an exemplary image displayed on a liquid crystal display in a gaming machine according to the second embodiment.

FIGS. 15A to 15C are views each illustrating an exemplary image displayed on a liquid crystal display in a gaming machine according to the second embodiment.

FIG. 15A illustrates the side bet image 301 and the number-of-jackpot image 302 displayed in the side game-related information display area 305, in the same manner as in FIG. 1A.

In FIG. 15B, "PERFECT BLACKJACK" is not established, which is different from FIG. 1B. However, "NORMAL BLACKJACK" is established.

In FIG. 15C, the side game result image 95 is an image of characters "NORMAL BLACKJACK" because "NORMAL BLACKJACK" is established as illustrated in FIG. 15B.

On the other hand, the side payout image 304 indicates that 100 credits, not 678 credits, the value of which is equal to the number of jackpots, are paid out to the player as the side payout.

As above, when "NORMAL BLACKJACK" is established in a case where the side bet has been placed, a fixed payout of 100 credits is paid out as the side payout in the second embodiment.

Figure 16:
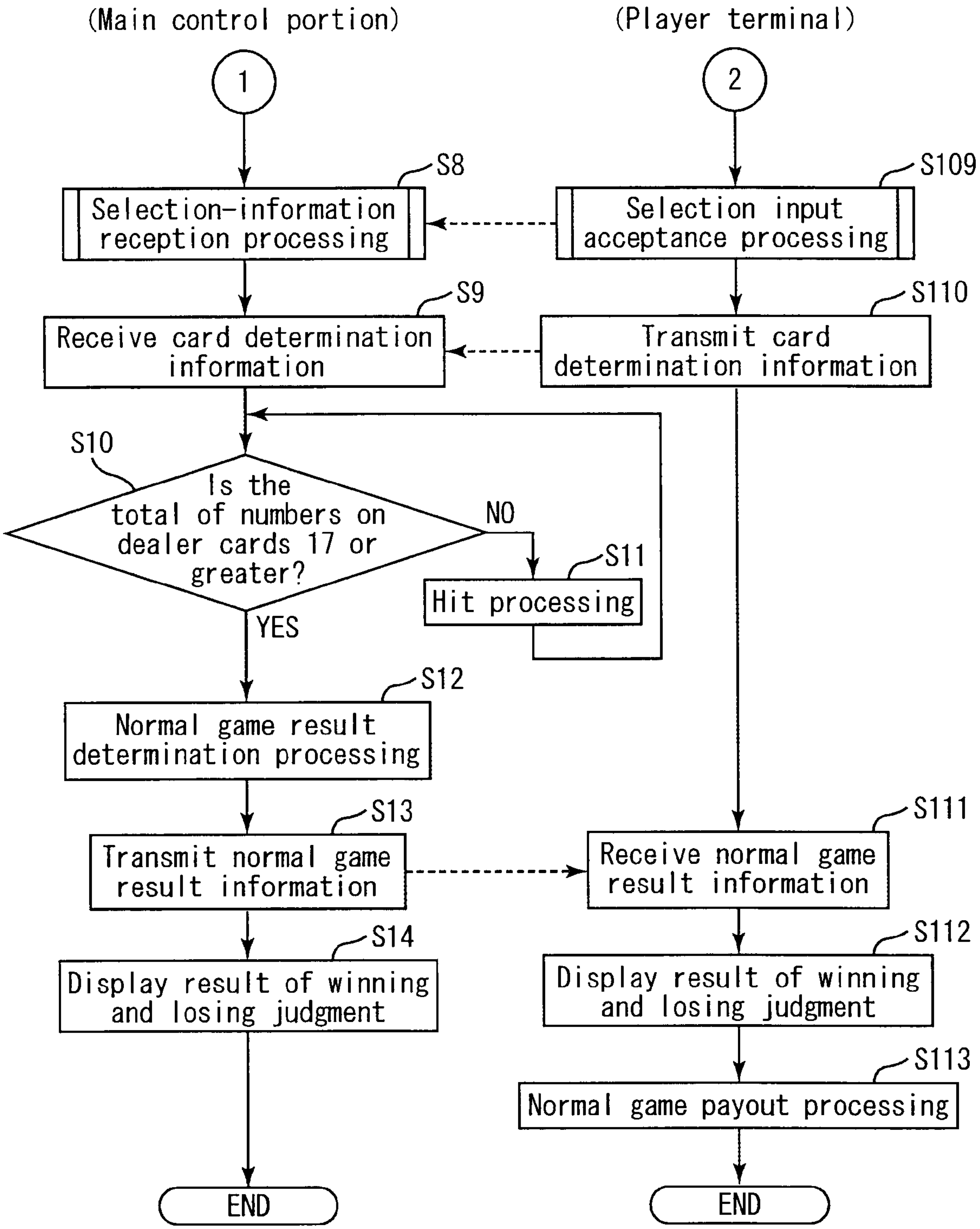
FIG. 16 is a flowchart of the game processing program of the gaming machine.

FIG. 16 is a flowchart of the game processing program of the gaming machine according to the second embodiment.

Figure 9:
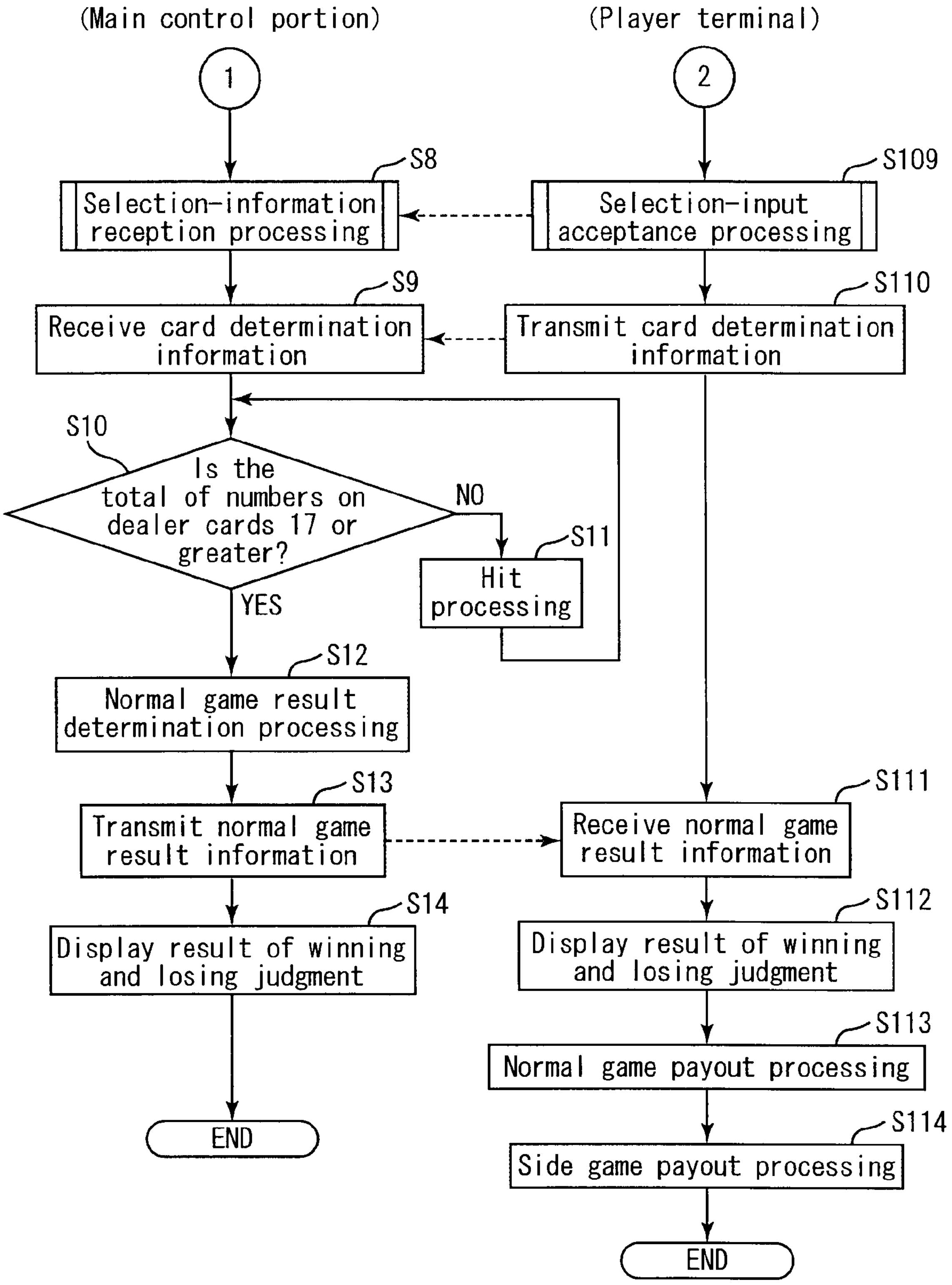
FIG. 9 is a flowchart of the game processing program of the gaming machine according to one embodiment of the present invention.

In the first embodiment, there has been described a case where the side game payout processing (step S114) is executed after the execution of the normal game payout processing (step S113) as illustrated in FIG. 9. On the other hand, in the second embodiment, the side game payout processing (step S114) is not set to be executed after the execution of the normal game payout processing (step S113) as illustrated in FIG. 16.

Figure 17:
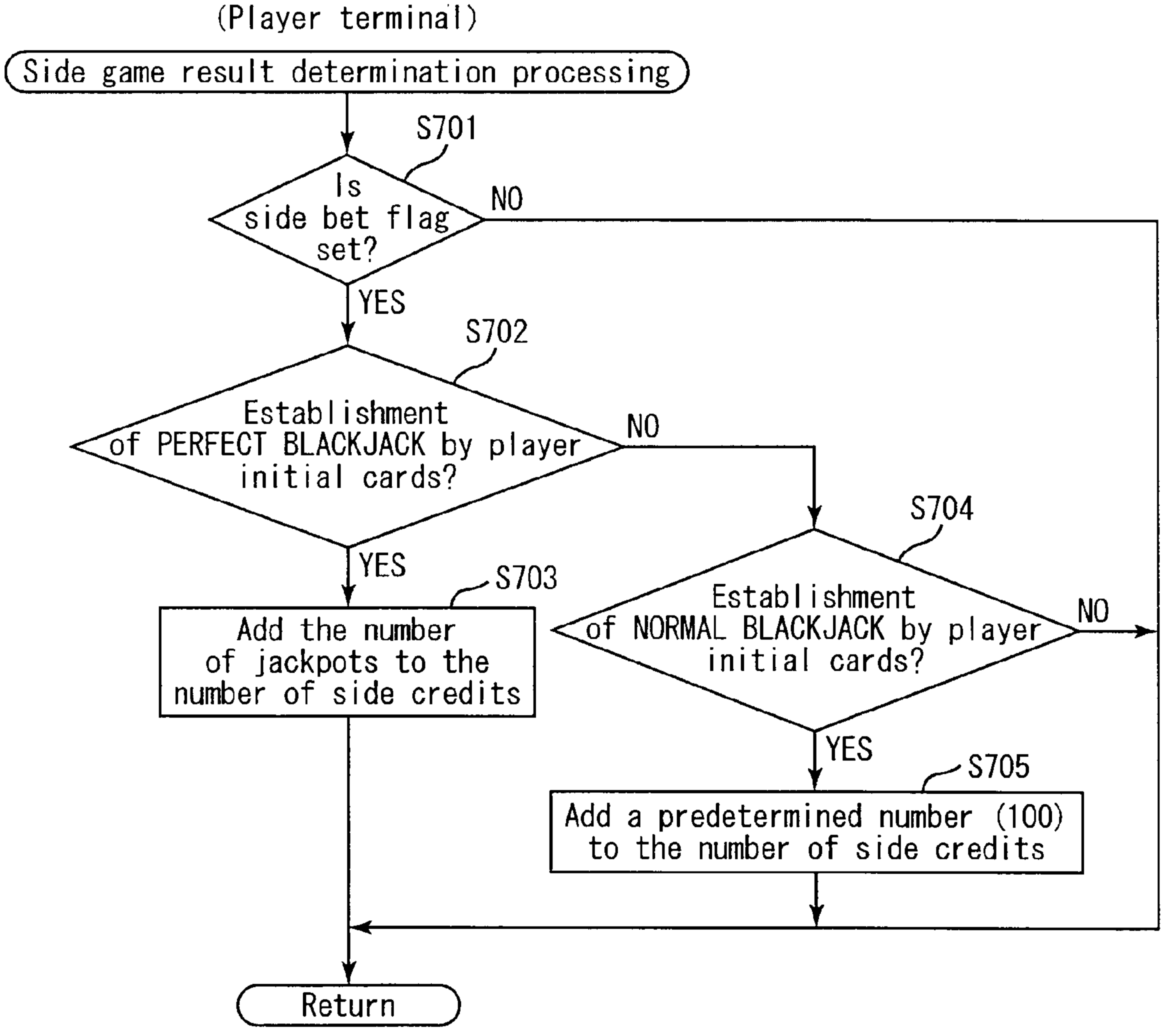
FIG. 17 is a flow chart illustrating a subroutine of side game result determination processing executed in each player terminal.

FIG. 17 is a flowchart illustrating a subroutine of side game result determination processing executed in each player terminal according to the second embodiment.

First, the CPU 51 determines whether or not the side bet flag is set in the RAM 52 (step S701).

When determining the side bet flag is set, the CPU 51 determines whether or not "PERFECT BLACKJACK" is established based on the player initial card information (see step S106 of FIG. 8) (step S702). Namely, the CPU 51 determines whether or not a combination of two player initial cards is "'A of Spades' and 'J of Spades'" or "'A of Spades' and 'J of Clubs'".

When determining "PERFECT BLACKJACK" is not established, the CPU 51 determines whether or not "NORMAL BLACKJACK" is established based on the player initial card information (see step S106 of FIG. 8) (step S704). Namely, the CPU 51 determines whether of not two player initial cards includes a card of "A" and a card of "10", "J", "Q", or "K".

When determining "PERFECT BLACKJACK" is established in step S702, the CPU 51 adds the value corresponding to the number of jackpots indicated by the number-of-jackpot information (see step S105 of FIG. 8) to the number of side credits (step S705).

On the other hand, when determining "NORMAL BLACKJACK" is established in step S704, the CPU 51 adds a predetermined number (100) to the number of side credits (step S705).

As above, in the second embodiment, the value corresponding to the number of jackpots or a predetermined number (100) is added to the number of side credits and the side payout is offered based on the number of side credits.

The CPU 51 ends the present subroutine when determining the side bet flag is not set in step S701, when determining "NORMAL BLACKJACK" is not established in step S704, or after the processing of step S703 or step S705.

Figure 18:
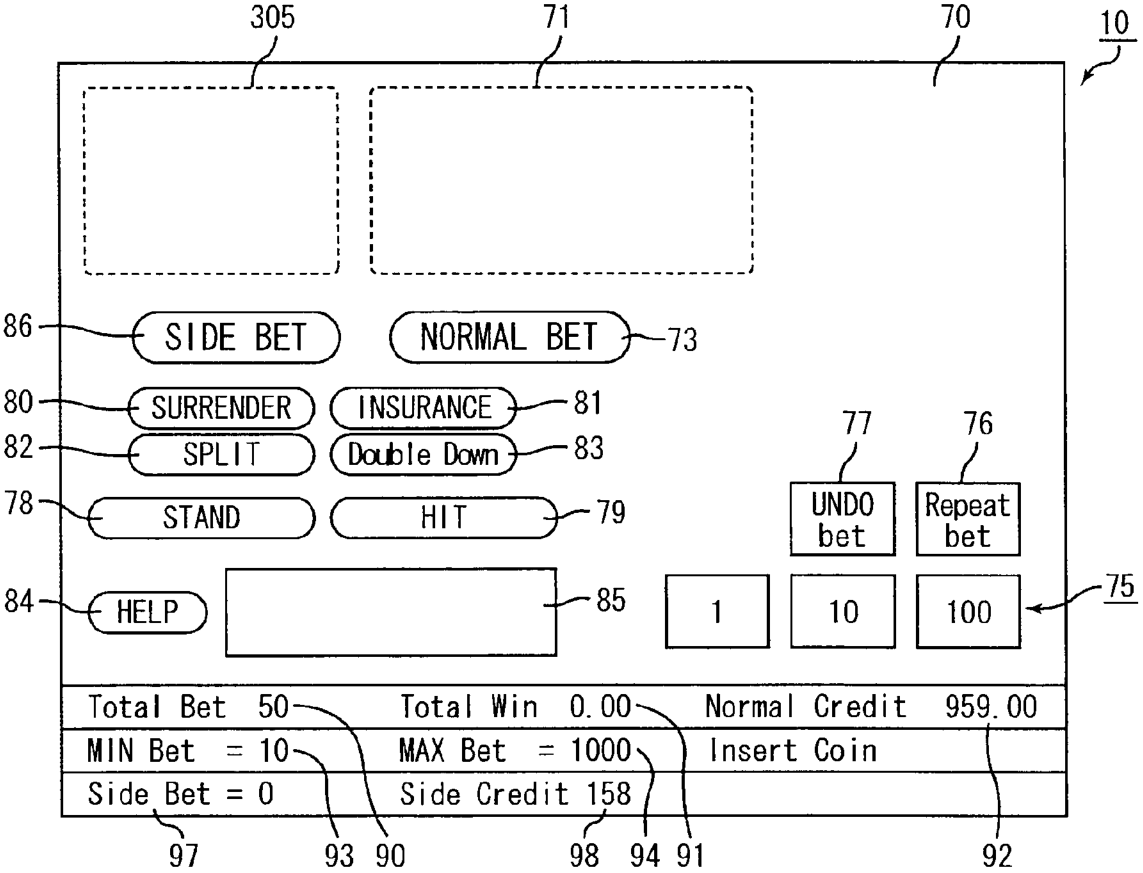
FIG. 18 is an explanatory view illustrating a game screen displayed on a front display

FIG. 18 is an explanatory view illustrating a game screen displayed on the liquid crystal display of the player terminal according to the second embodiment.

As illustrated in FIG. 18, a number-of-side-credits display area 98 is provided on the game screen 70 according to the second embodiment. The number-of-side-credits display area 98 displays the current number of the side credit. The number of side credits is stored in the RAM 52. It is to be noted that the number of credits in the first embodiment is referred to as the number of normal credits in the second embodiment.

As shown in the following, the side credit has an influence on the selection of the side bet and a special button.

Figure 19:
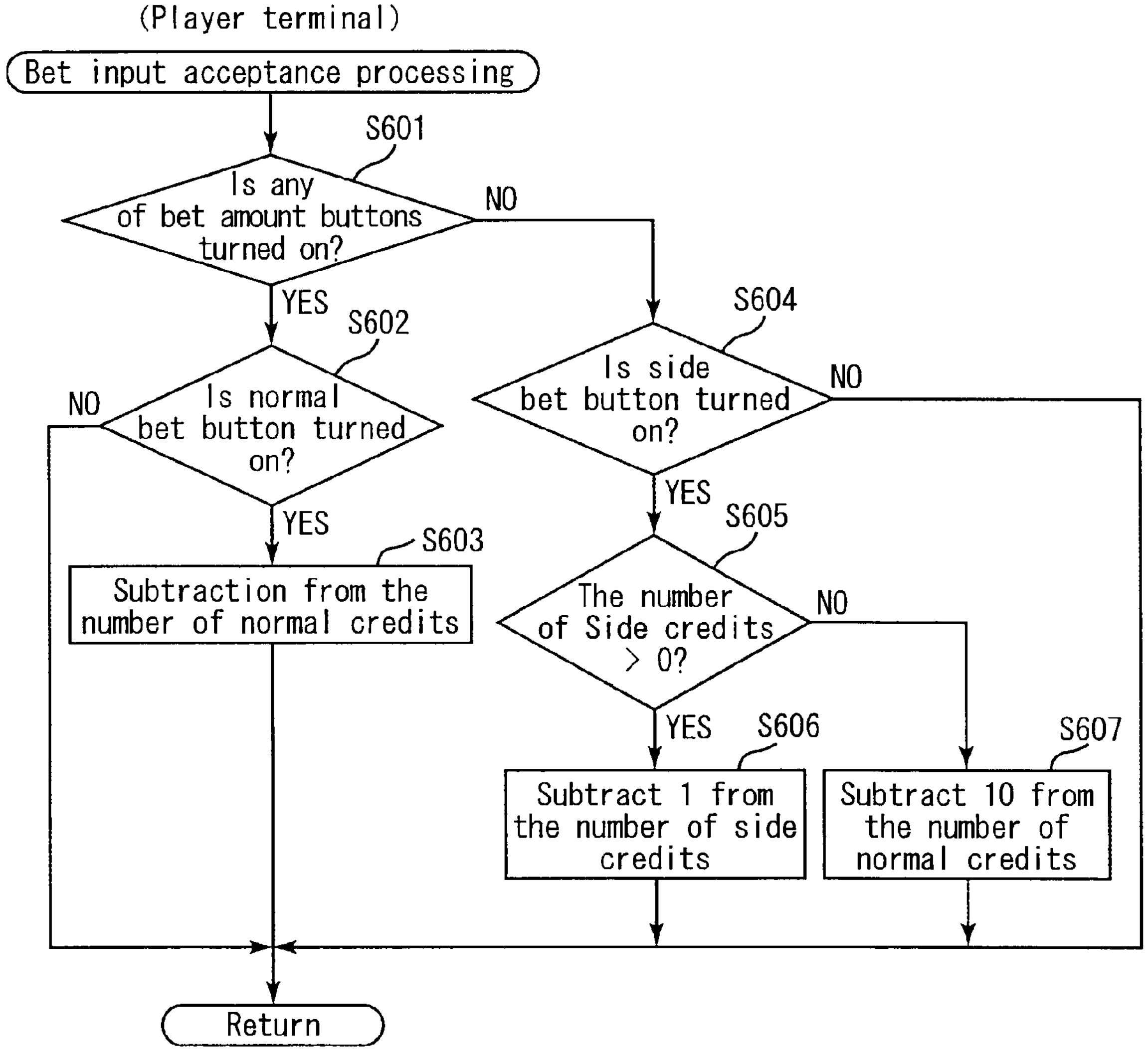
FIG. 19 is a flowchart illustrating a subroutine of bet input acceptance processing executed in each player terminal.

FIG. 19 is a flowchart illustrating a subroutine of bet input acceptance processing executed in each player terminal.

The processing of step S601 to step S604 is the same as the processing of step S201 to step S204 of FIG. 10, and therefore, the descriptions thereof are omitted here.

When determining that the side bet button has been turned on in step S604, the CPU 51 determines whether or not the number of side credits is greater than 0 (step S605).

When determining the number of side credits is greater than 0, the CPU 51 subtracts one from the number of side credits (step S606).

On the other hand, when determining the number of side credits is 0, the CPU 51 subtracts 10 from the number of normal credits (step S607).

As above, according to the gaming machine 1 of the second embodiment, the required number of credits for placing a side bet is smaller in the case where the number of side credits is greater than 0, compared to the case where the number of side credits is 0. To get the side credit, the player need to place a side bet (see step S703 and step S705 of FIG. 17). Accordingly, it is possible to encourage the player to place a side bet of 10 credits, who wishes to be allowed to place a side bet of the smaller number (1) of credits. Once the player gets a side credit, the player is allowed to play a game for a long time because the side credit is reduced only little by little.

Figure 20:
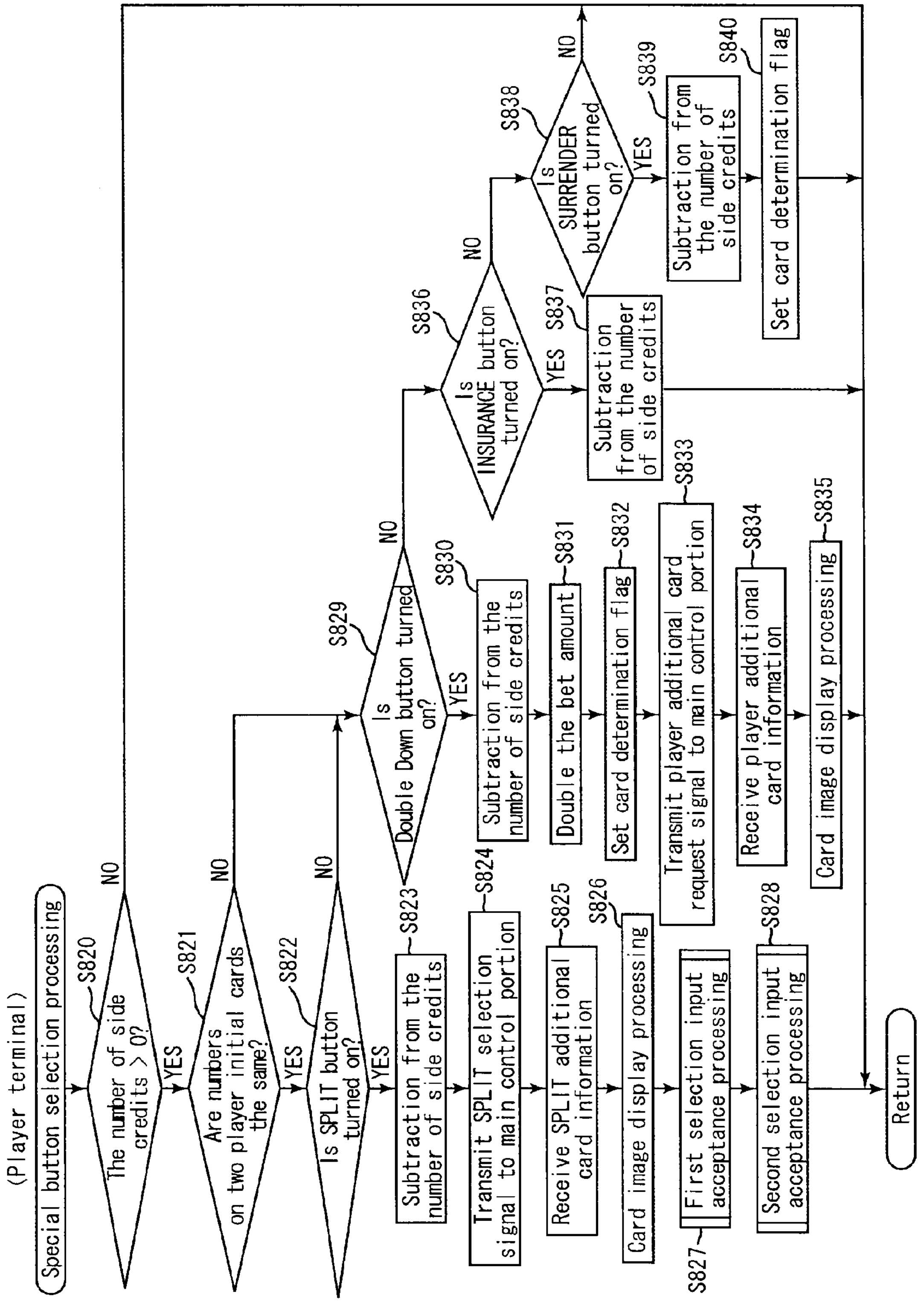
FIG. 20 is a flowchart illustrating a subroutine of special button selection processing executed in each player terminal.

FIG. 20 is a flowchart illustrating a subroutine of special button selection processing executed in each player terminal.

The processing of step S821 to step S840 is substantially the same as the processing of step S421 to step S440 of FIG. 13.

The CPU 51 determines whether or not the number of side credits stored in the RAM 52 is greater than 0 (step S820). When determining the number of side credits is greater than 0, the CPU 51 executes the processing of step S821 to step S840. On the other hand, when determining the number of side credits is 0, the CPU 51 ends the present subroutine without executing the processing of step S821 to step S840.

It is to be noted that the value corresponding to the button having been turned on and the normal bet amount is subtracted from the side bet amount when the SPLIT button has been turned on, when the Double Down button has been turned on, when the INSURANCE button has been turned on, or when the SURRENDER button has been turned on (see steps S823, S830, S837, and S839).

Namely, according to the gaming machine 1 of the second embodiment, the player can select an option out of SPLIT, Double Down, INSURANCE, and SURRENDER on condition that the number of side credits is greater than 0. Accordingly, it is possible to encourage the player to place a side bet, who wishes to select such special buttons. The player having got the side credit is allowed to input a command that other players cannot select, such as SPLIT, Double Down, INSURANCE, and SURRENDER. As a result, the player enjoys a feeling of superiority.

In the second embodiment, there has been described a case where a payout based on the number of jackpots is offered as the side payout when "PERFECT BLACKJACK" is established. Further, a fixed payout of a predetermined number (100) of credits is paid out as the side payout when "NORMAL BLACKJACK" is established. However, in the present invention, the processing of offering the first payout (additional payout) based on the cumulatively stored game media is not limited to this case. For example, the payout may be offered based on the number of jackpots both in a case where "PERFECT BLACKJACK" is established and in a case where "NORMAL BLACKJACK" is established. In this case, the amount of game media to be paid out as the first payout (additional payout) may be different in a case where "PERFECT BLACKJACK" is established and in a case where "NORMAL BLACKJACK" is established.

Figure 21:
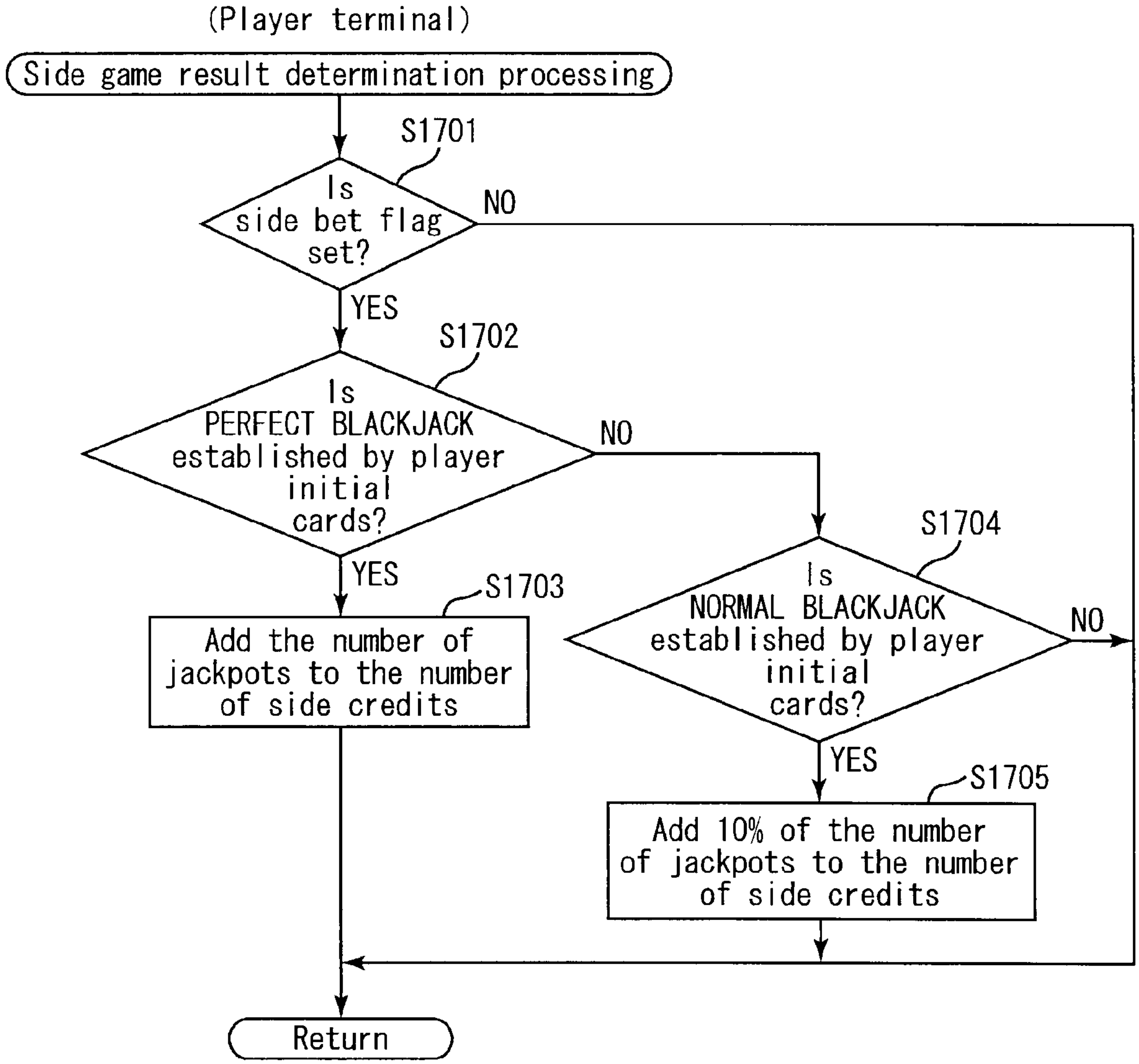
FIG. 21 is a flow chart illustrating a subroutine of side game result determination processing executed in each player terminal.

FIG. 21 is a flowchart illustrating a subroutine of side game result determination processing according to another embodiment.

In step S1703, the CPU 51 adds the value corresponding to 100% of the number of jackpots indicated by the number-of-jackpot information (see step S105 of FIG. 8) to the number of side credits.

On the other hand, in step S1705, the CPU 51 adds the value corresponding to 10% of the number of jackpots indicated by the number-of-jackpot information (see step S105 of FIG. 8) to the number of side credits.

The other processing of the present subroutine is the same as the processing described with reference to FIG. 17, and thus the descriptions thereof are omitted here.

In the above embodiments (the first embodiment and the second embodiment), the player cards are displayed on the liquid crystal display 10 and the front display 21. The liquid crystal display 10 and the front display 21 constitute the display of the present invention. As in this case, the display of the present invention may have two or more displays, or may have one display.

In the above embodiments, the player can input a command in the game such as selection of "hit" or "stand" by using the touch panel 11. The touch panel 11 corresponds to the input device of the present invention. The input device of the present invention is not particularly limited, and a conventionally known input device such as buttons and the like may be used. Further, as an input device with which a player places a normal bet and a side bet, a currency insertion slot through which a currency such as a coin and a bill can be inserted may be used.

In the above embodiments, the processing executed in the gaming machine 1 is conducted by the CPU 41 of the main control portion 31 together with the CPU 51 of each player terminal 4. The CPU 41 and the CPU 51 constitute the controller of the present invention. In this way, the controller of the present invention may have multiple CPUs, or may have one CPU.

Further in the above embodiments, the result of the side game is determined by determining whether or not "PERFECT BLACKJACK" or "NORMAL BLACKJACK" is established. However, in the present invention, the processing of determining the result of the side game is not limited to this case.

For example, the result of the side game may be determined by determining whether or not the numbers allocated to a plurality of cards forming the player initial cards are the same. Further, the result of the side game may be determined by determining whether or not the suits allocated to a plurality of cards forming the player initial cards are the same.

For another example, the result of the side game may be determined based on the number of the same numbers among the numbers allocated to a plurality of cards forming the player initial cards. Further, the result of the side game may be determined based on the number of the same suits among the suits allocated to a plurality of cards forming the player initial cards.

In the above embodiments, a Blackjack game is played as a normal game (card game). However, the normal game (card game) of the present invention is not limited to a Blackjack game. The normal game of the present invention may be a game such as poker.

Further, the cards used in the present invention are not limited to playing cards each of which carries a number and a suit, and the cards may be ones used for a game such as hanafuda.

In the above embodiments, the side bet amount is a preliminary set amount. However, in the present invention, it may be configured that the player can select the side bet amount.

In the above embodiments, the credit corresponding to the number of jackpots is paid out as the side payout when "PERFECT BLACKJACK" is established. However, in the present invention, the processing of offering the first payout (additional payout) based on the cumulatively stored game media is not limited to this example. For example, game media in an amount corresponding to the side bet amount may be paid out as the first payout (additional payout) based on the cumulatively stored game media.

In the above embodiments, a Blackjack game is executed in the gaming machine 1.

Figure 22:
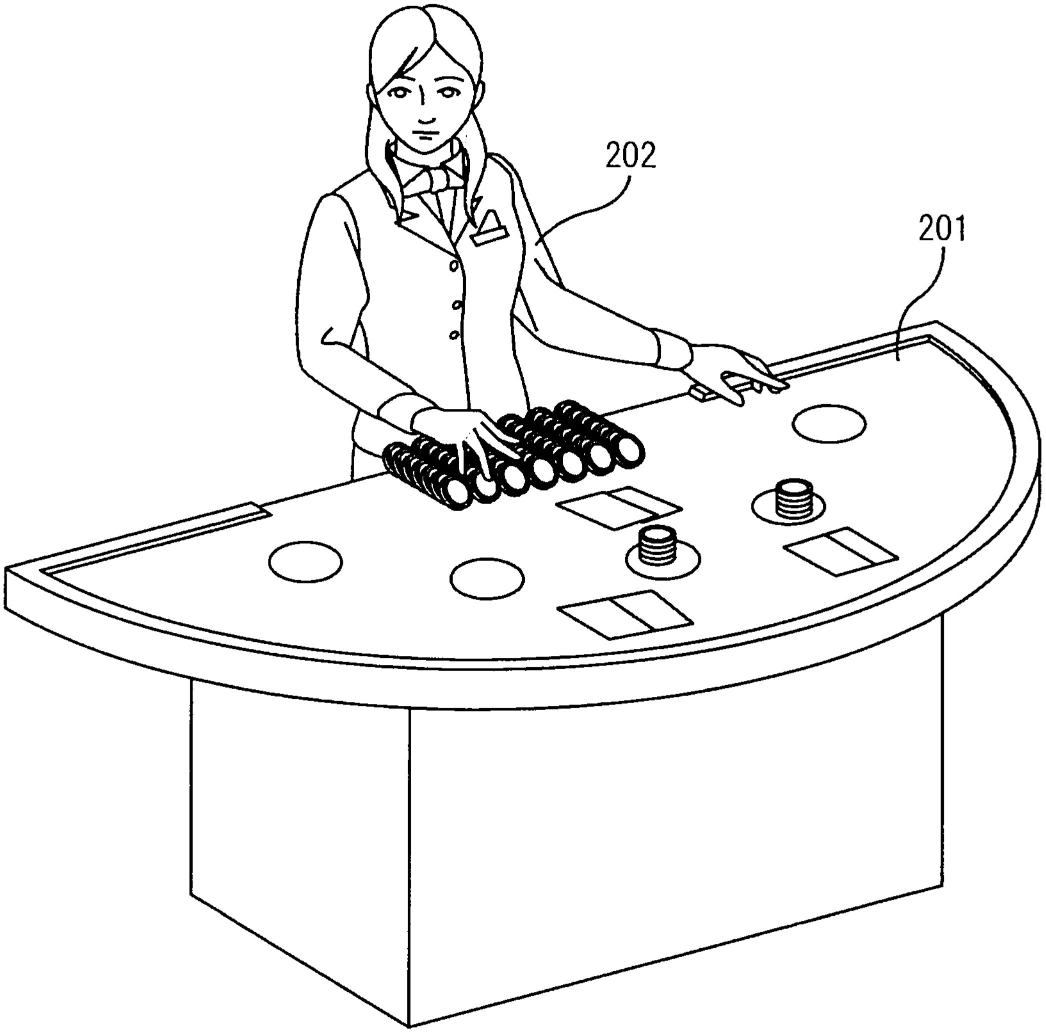
FIG. 22 is a schematic view illustrating an example of a table game in which the present invention is applied.

However, the playing method of a game according to the present invention can be applied also to a card game (so-called table game) in which a dealer 202 and a player (not illustrated) play on a game table 201, as illustrated in FIG. 22.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer or a computer network. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, another configuration requested for performing each step should become apparent from the above descriptions.

What is claimed as new and desired to be secured by Letters Patent of the United States is:

1. A gaming machine comprising:

an input device allowing input of a command relative to a normal game and a side game played at a gaming terminal;

a display capable of displaying a game piece at the gaming terminal;

a memory storing:

a game program, which controls progress of the normal and side games played at the gaming terminal;

a normal credit amount; and a side credit amount; and a controller programmed to:

(A) accept an input from the input device for placing a normal bet on a result of the normal game played at the gaming terminal;

(B) accept an input from the input device for placing a side bet on a result of the side game played at the gaming terminal;

(C) initiate the normal and side games based on the game program stored in the memory;

(D) when the side bet has been placed in the processing (B), advance the side game at the gaming terminal based on the game program stored in the memory and determine the result of the side game;

(E) offer a first payout based on the result of the side game determined in the processing (D) by increasing the side credit amount, and, (F) when the normal bet has been placed in the processing (A), advance the normal game at the gaming terminal based on the game program stored in the memory, determine a result of the normal game, and offer a second payout based on the result of the normal game by not increasing the side credit amount, wherein the side credit amount is decreased by a first value for placing the side bet when the side credit amount is greater than a predetermined value, and wherein, the normal credit amount is decreased by a second value for placing the side bet when the side credit amount is less than or equal to the predetermined value, and wherein, the second value is greater than the first value.

2. The gaming machine of claim 1 comprising a plurality of gaming terminals each including an input device and a display, wherein each of the input devices allows each gaming terminal to input a command relative to the normal game and side game.

3. The gaming machine of claim 2, wherein:
the game piece comprises a playing card;
the normal game is a card game played at the plurality of gaming terminals;
each of the displays is capable of displaying a plurality of playing cards at each of the gaming terminals; and
the memory stores a card game program for controlling progress of the card game played with the plurality of playing cards at the plurality of gaming terminals.

4. The gaming machine of claim 3, wherein the controller:
accepts an input from each of the input devices for placing a normal bet on a result of the card game;
accepts an input from each of the input devices for placing the side bet on the side game, the side bet based on a result of an initial card displayed in the card game, the side bet being different from the normal bet,
displays the initial card on the display of each gaming terminal;
determines a result of the side game based on the initial card displayed on the display of each gaming terminal, before a result of the card game is determined, when the side bet has been placed;
accepts from the input devices, after the initial card has been displayed, one of a card addition command to display an additional card different from the initial card, or a card determination command so as to not display the additional card;
display the additional card on the display when the card addition command has been input;
determine a result of the card game based on the initial card and the player additional card displayed, when the card determination command has been input; and
offer the second payout based on the result of the card game determined and the first payout based on the result of the side game.

5. The gaming machine of claim 4 wherein the controller:
cumulatively stores a predetermined percentage of side bet game media from each gaming terminal when the side bet has been placed; and,
offers the first payout based on the result of the side game and the stored game media.

6. The gaming machine of claim 4 wherein:
the cards displayed at the plurality of gaming terminals are each allocated with a number and a suit; and
the controller determines whether a combination of number and suit of the initial card displayed on the display of each gaming terminal is a predetermined combination to determine the result of the side game before the result of the card game is determined, when the side bet has been placed.

7. A gaming machine comprising:
an input device allowing input of a command relative to a normal game and a side game played at a gaming terminal;
a display capable of displaying a game piece at the gaming terminal;
a memory storing:
game program information, which controls progress of the normal and side games played at the gaming terminal;
a normal credit amount; and
a side credit amount; and
a controller programmed to:
(A) accept an input from the input device for placing a normal bet on a result of the normal game played at the gaming terminal from the input device;
(B) accept an input from the input device for placing a side bet on a result of the side game played at the gaming terminal;
(C) initiate the normal and side games based on the game program information stored in the memory;
(D) when the side bet has been placed in the processing (B), advance the side game at the gaming terminal based on the game program stored in the memory and determine the result of the side game;
(E) offer a first payout based on the result of the side game determined in the processing (D) by increasing the side credit amount, and,
(F) when the normal bet has been placed in the processing (A), advance the normal game at the gaming terminal based on the normal game program stored in the memory, determine a result of the normal game, and offer a second payout based on the result of the normal game by not increasing the side credit amount, wherein
if the side credit amount is greater than a predetermined value, offering an additional game play option during play of the normal game, which additional game play option is not available if the side credit amount is less than or equal to the predetermined number.

8. The gaming machine of claim 7 comprising a plurality of gaming terminals each including an input device and a display, wherein each of the input devices allows each gaming terminal to input a command relative to the normal game and side game.

9. The gaming machine of claim 8, wherein:
the game piece comprises a playing card;
the normal game is a card game played at the plurality of gaming terminals;
each of the displays is capable of displaying a plurality of playing cards at each of the gaming terminals; and
the memory stores a card game program for controlling progress of the card game played with the plurality of playing cards at the plurality of gaming terminals.

10. The gaming machine of claim 9, wherein the controller:
accepts an input from each of the input devices for placing a normal bet on a result of the card game;
accepts an input from each of the input devices for placing the side bet on the side game, the side bet based on a result of an initial card displayed in the card game, the side bet being different from the normal bet,
displays the initial card on the display of each gaming terminal;
determines a result of the side game based on the initial card displayed on the display of each gaming terminal, before a result of the card game is determined, when the side bet has been placed;
accepts from the input devices, after the initial card has been displayed, one of a card addition command to display an additional card different from the initial card, or a card determination command so as to not display the additional card;
display the additional card on the display when the card addition command has been input;
determine a result of the card game based on the initial card and the player additional card displayed, when the card determination command has been input; and
offer the second payout based on the result of the card game and the first payout based on the result of the side game.

11. The gaming machine of claim 10 wherein the controller:

cumulatively stores a predetermined percentage of side bet game media from each gaming terminal placing the side bet; and, offers the first payout based on the result of the side game and the stored side bet game media.

12. The gaming machine of claim 10 wherein:

the cards displayed at the plurality of gaming terminals are each allocated with a number and a suit; and the controller determines whether a combination of the number and the suit of the initial card displayed on the display of each gaming terminal is a predetermined combination to determine the result of the side game before the result of the card game is determined, when the side bet has been placed.

13. A playing method of a game on a gaming machine including:

a plurality of gaming terminals, a controller, and a memory storing:

a game program, which controls progress of a normal game and a side game played at the gaming terminals;

a normal credit amount; and a side credit amount; wherein the method comprises the steps of:

with the controller:

(A) accepting an input from an input device for placing a normal bet on a result of the normal game played at each of the gaming terminals;

(B) accepting an input from the input device for placing a side bet on a result of a side game played at one of the gaming terminals;

(C) initiating the normal and side games based on the game program stored in the memory;

(D) when the side bet has been placed in the processing (B), advancing the side game at the gaming terminal that placed the side bet based on the game program stored in the memory, and determining a result of the side game;

(E) offering a first payout based on the result of the side game determined in the processing (D) by increasing the side credit amount, and, (F) when the normal bet has been placed in the processing (A), advancing the normal game at the gaming terminal based on the game program stored in the memory, determining a result of the normal game, and offering a second payout based on the result of the normal game by not increasing the side credit amount, wherein the side credit amount is decreased by a first value for placing the side bet when the side credit amount is greater than a predetermined value, and wherein, the normal credit amount is decreased by a second value for placing the side bet when the side credit amount is less than or equal to the predetermined value, and wherein, the second value is greater than the first value.

14. A playing method of a game on a gaming machine including:

a plurality of gaming terminals, a controller, and a memory storing:

a game program, which controls progress of a normal game and a side game played at the gaming terminals;

a normal credit amount; and a side credit amount; wherein the method comprises the steps of:

with the controller:

(A) accepting an input from an input device for placing a normal bet on a result of the normal game played at each of the gaming terminals;

(B) accepting an input from the input device for placing a side bet on a result of a side game played at one of the gaming terminals;

(C) initiating the normal and side games based on the game program stored in the memory;

(D) when the side bet has been placed in the processing (B), advancing the side game at the gaming terminal that placed the side bet based on the game program stored in the memory, and determining a result of the side game;

(E) offering a first payout based on the result of the side game determined in the processing (D) by increasing the side credit amount, and, (F) when the normal bet has been placed in the processing (A), advancing the normal game at the gaming terminal based on the game program stored in the memory, determining a result of the normal game, and offering a second payout based on the result of the normal game by not increasing the side credit amount, wherein if the side credit amount is greater than a predetermined value, offering an additional game play option during play of the normal game, which additional game play option is not available if the side credit amount is less than or equal to the predetermined number.

* * * * *